United States Patent
Sosnovsky et al.

(10) Patent No.: US 7,552,446 B1
(45) Date of Patent: Jun. 23, 2009

(54) METHODS AND APPARATUS FOR A TIMER EVENT SERVICE INFRASTRUCTURE

(75) Inventors: Stanislav Sosnovsky, Upton, MA (US); Ruben Michel, Hopkinton, MA (US); Ilya Liubovich, Shrewsbury, MA (US)

(73) Assignee: EMC Corporation, Hopkinton, MA (US)

( * ) Notice: Subject to any disclaimer, the term of this patent is extended or adjusted under 35 U.S.C. 154(b) by 688 days.

(21) Appl. No.: 10/750,413

(22) Filed: Dec. 31, 2003

(51) Int. Cl.
*G06F 3/00* (2006.01)
*G06F 9/44* (2006.01)
*G06F 9/46* (2006.01)
*G06F 13/00* (2006.01)
*G06F 1/00* (2006.01)
*G06F 1/04* (2006.01)
*G06F 1/14* (2006.01)

(52) U.S. Cl. .................. 719/318; 719/328; 713/501; 713/502

(58) Field of Classification Search .............. 719/328, 719/318; 713/501, 502
See application file for complete search history.

(56) References Cited

U.S. PATENT DOCUMENTS 5,644,772 A * 7/1997 Mann .................. 710/260

2003/0135781 A1* 7/2003 Da Palma et al. .............. 714/2

OTHER PUBLICATIONS

Silberschatz et al., "Applied Operating System Concepts", First Edition, John Wiley & Sons, Inc., 2000; pp. 38-39, 53-56, 87-95, 115-132, 135-141, 255-265, 292-293, 406-410, 416-417, 515-519.*
Flanagan, David, "Java in a Nutshell", Third Edition, O'Reilly & Associates, Inc., 1999; pp. 497, 536-537.*
"Microsoft Computer Dictionary," Fifth Edition, Microsoft Press, 2002; p. 510.*

* cited by examiner

*Primary Examiner*—Meng-Ai An
*Assistant Examiner*—Nathan Price
(74) *Attorney, Agent, or Firm*—Chapin IP Law, LLC

(57) ABSTRACT

Complex software systems often require time-based processing, such as delayed or periodic timer event handling. A timer service provides an Application Programming Interface (API) for managing timers, and therefore provides a developer abstraction for representing time-based processing. In operation, the timer service infrastructure employs a plurality of timer events, each having a corresponding timer handler, in which each of the timer events is associated with a generic timer reference, employed by a timer interface. The generic reference, therefore, may refer to any of the plurality of timers. The timer service may disable, or passivate modules including subscribers having timer handlers without disrupting timer continuity and invocation. Upon timer expiration, the timer service enables modules having subscribers to the timer. The timer service therefore seamlessly enables inactive modules upon timer expiration. Further, the common generic timer reference avoids timer event specific stubs and references related to specific classes, which tend to complicate deployment.

37 Claims, 11 Drawing Sheets

METHODS AND APPARATUS FOR A TIMER EVENT SERVICE INFRASTRUCTURE

BACKGROUND OF THE INVENTION

In a typical conventional managed information environment, such as a storage area network (SAN) operable to coordinate access to mass storage devices by a set of users, the storage area network interconnects a plurality of storage device nodes and associated interconnection nodes. The storage area network includes a variety of nodes for providing mass storage retrieval services to users, such as storage devices (e.g. disc drive arrays), connectivity devices (e.g. switches and routers), and conventional host computers for executing software components called agents for monitoring and controlling the nodes in the storage area network. The resultant infrastructure, therefore, for monitoring and controlling the storage area network, defines a complex array of nodes and interconnections.

Management of the storage area network infrastructure is a formidable endeavor. The multitude of nodes and interconnections between the various nodes present a substantial monitoring and control task for tracking throughput, identifying bottlenecks, and pinpointing failures, for example. In a typical conventional managed information services network, a network management application, such as a Simple Network Management Protocol (SNMP) based application, for example, assists operators and users in gathering feedback from the network and performing diagnostic activities for isolating problem areas, performing remedial action, and improving efficiency of the conventional network infrastructure.

Complex software systems such as the managed information network often employ a timer mechanism in order to notify interested parties of significant time-based or periodic timer events, such as reports, backups, and accounting operations, for example. In conventional software systems predefined or sufficiently automated timer notification may not be available. In languages employed for development of such conventional software systems, such as the C++ programming language, for example, service layers providing support for notification mechanisms may be implemented. In such a managed information network, notification mechanisms typically inform applications and other managing entities of various occurrences detected by deployed entities in the environment. Often, such timer expiration notifications take the form of timer events, or alerts, which a detecting entity reports to a monitoring or responsible entity. The notification mechanisms typically strive to organize and propagate the alerts in a systematic manner according to a predetermined protocol. The predetermined protocol provides assurances that information in the alerts and corresponding responsive action occurs in a timely and/or effective manner to maintain the conventional managed information environment near peak efficiency.

SUMMARY

In a conventional managed information environment network, notification mechanisms typically monitor the various nodes and interconnections in the network. Such a network typically includes a large number of nodes, or manageable entities, for performing various operations and services in the network. The manageable entities may include, for example, host nodes, software agent components, storage arrays, interconnection components including routers and switches, and others. The environment employs certain operations and functions to perform, or execute, according to a periodic basis by a timer notification system, or timer service. The timer notification system gathers and propagates information pertaining to the interconnected manageable entities for ensuring prompt and efficient remedial and/or responsive action to various occurrences in the environment.

Complex software systems often require time-based processing, such as delayed or periodic timer event handling. A timer service, discussed further below, provides an Application Programming Interface (API) for managing timers, and therefore provides a convenient abstraction for representing time-based processing. Application programmers schedule named timers to expire and initiate timer handlers at specific future times. The timer service supports two types of timers: Aperiodic timers publish a single timer event following a defined delay. Such timers are useful in processing timeout conditions following component initialization. In contrast, periodic timers publish periodically following a defined delay. Such timers are useful in collecting performance statistics, or for system health monitoring.

A troublesome drawback of the C++ programming language is that it lacks such a standard timer service. Disclosed herein is a user-friendly, resource-conserving, and strongly-typed timer service. The user-friendliness of the timer service stems from its minimal interface, consisting of several API calls: schedule_aperiodic_timer( ), reschedule_aperiodic_timer( ), schedule_periodic_timer( ), reschedule_periodic_timer( ), cancel_timer( ), cancel_all_timers( ), and find_timer( ). The resource-conserving nature of the timer service stems from its integration into the component framework, while imposing a limited overhead on system resources. The strong typing of the timer service stems from its ability to verify at compile time that the subscriber classes have appropriate timeout handlers.

Conventional invocation and activation mechanisms, such as Java Enterprise Edition (J2EE) and JavaBeans, have constraints on usage such as maintaining state and pooling. For example, in an Enterprise JavaBeans implementation, the life cycle of a message-driven bean (MDB) is not dynamic. An MDB is either in does not exist state or in the pooled state, as follows. When a conventional container decides to add a another instance to its pool, it creates a new instance, passes the instance its MessageDrivenContext object and then calls ejbCreate( ), allowing the bean to initialize itself. That application server will likely create an initial pool of beans at boot time and then increase the size of the pool as the quantity of messages increases. A container will remove an instance from the pool and destroy it at system shutdown or when the container decides it needs to decrease the size of the pool to conserve cache space. If the container decides to take an instance out of the bean pool, it calls bean's ejbRemove( ). Accordingly, there is no active or passive state, in contrast to stateful beans. Also, MDBs lack an identity (analogous to the transient IOR).

In a large conventional managed environment, development efforts often consume substantial time and effort for coordinating the timer service throughout the application under development. Adherence to the predetermined protocol encounters consistency issues, staffing education issues, and deployment issues, as such an effort typically involves many engineers of various experience levels. Novice developers may be unfamiliar with the timer service, and therefore find the timer service cumbersome to implement. Multiple, complex definitions of timer events and related data increase ramp-up time for new developers, and tend to complicate deployment by incorporating many definitions and related entities in the software build process. For example, a particular developer may require only reporting or processing of a single timer event, yet must inherit timer event definitions and classes (i.e. include files) corresponding to a much larger scope of potential timer events.

Embodiments of the invention are based, in part, on the observation that conventional timer and timer services require the service to track and provide enablement or activation of a handler (or, more specifically, of a subscriber and module including a handler) the service is to invoke. Such conventional services further typically inherit a plurality of classes, or definitions, for the timer events for which the service monitors and controls invocation. Corresponding handlers inherit similarly, even for definitions which the handler does not directly employ. Accordingly, it would be beneficial to deploy a timer event mechanism that selectively invokes disabled or inactive modules (e.g., CORBA objects) upon timer expiration for invoking a timer handler, and which does not mandate inheritance of extraneous classes or other definitions not germane to a particular handler.

Configurations of the invention substantially overcome the above described shortcomings presented by tracking timers and invoking subscribers and corresponding handlers upon timer expiration by determining enablement and selectively enabling modules if necessary. The system of the present invention further provides a common timer interface for subscribers to the timer service, thereby establishing a common generic interface applicable to each timer handler and avoiding excessive inheritance of multiple and/or extraneous timer specific classes. An example embodiment of the invention is a timer service that extends the functionality of a component server such as a CORBA component server. The timer service of this invention can be used by components that operate in a component execution environment (e.g., CORBA) to set timer events and subscribers can subscribe to these events. Once set or subscribed to, the component(s) to be alerted or notified of expiration of a timer event can become disabled (e.g., shutdown, de-allocated from memory, etc.) thus freeing up processing resources (memory, processor cycles, etc.) for use by components that must remain active. Upon occurrence of the timer event (e.g., expiration of the timer) as detected by the timer service, the timer service of this invention operates in conjunction with the component server to cause activation or enablement of the modules or component(s) that must be notified of the timer event.

Embodiments of the timer service of this invention incorporate particular features. For example, in one embodiment a component (module) is automatically activated when a timer event is published (i.e. a timer expiration notification) to a subscriber within that component. This feature is accomplished in one embodiment through a collocated Common Object Request Broker Architecture (CORBA) call. Conventional component-based middleware does not support this resource-conserving feature. Further, the timer service may disable (i.e. passivated) the module that is handling timer events on demand, without concern for missing or ignoring the timer. Passivation is delayed until all outstanding timer publications (notifications) terminate, either by completing timeout handling or through cooperative thread cancellation. Also, the timer service avoids employing the Object Management Group Interface Definition Language (OMG/IDL), a common interface and support tool which may contribute unnecessarily to code volume and complexity. Therefore, developers using the timer service need not know OMG IDL, and are free to use the C++ Standard Library in the subscriber class definitions.

In operation, the timer service infrastructure is characterized by defining a plurality of timer events, each having a corresponding timer handler, in which each of the plurality of timer events is associated with a generic timer reference, employed by a timer interface. The generic reference, therefore, may refer to any of the plurality of timers. The timer service may disable, or passivate modules including subscribers having timer handlers without disrupting timer continuity and invocation. The timer service therefore seamlessly enables inactive modules upon timer expiration. Further, the common generic timer reference may, in particular configurations, avoid timer event specific stubs and references related to the timer event specific class, which tend to complicate deployment.

In the particular exemplary configuration described below, traversing the associations includes indexing, in the global mapping via the timer name, a persistent reference to the module including the subscriber and handler associated with the timer. The persistent reference in the global (persistent) timer map is operable to identify a module and handler independently of enablement of the module containing the associated timer handler. Accordingly, associating the timer identity by creating a mapping to the timer handler includes a local timer event map and a global timer map. The timer service first creates, via a module timer service, a local mapping entry in the local timer map having a reference to the subscriber entity including the corresponding timer handler, and then creates the global mapping entry corresponding to the module including the corresponding timer handler. The global mapping entry is operable to trigger selective enablement of the handling module (i.e. module including a subscriber having the timer handler).

In further detail, the method for processing timed timer events includes the timer service receiving a timer subscription containing a time value and an identity of a module to notify upon expiration of the time value, and establishing a timer to track expiration of the time value. At the prescribed time, the timer service detects expiration of the timer, and, in response to detecting expiration of the timer, determines if the module having the subscriber including the timer handler is disabled. If the corresponding module is disabled (passivated), the timer service enables the module, and notifies the subscriber in the module of expiration of the timer. Accordingly, the notification of the subscriber of the expiration of the timer causes the subscriber invoking the indicated timer handler for execution.

The timer service establishes the timer by adding the identity of the module to a global timer map, in which the global timer map is operable to indicate a plurality of modules, and adds a reference to the subscriber including the timer handler into a local timer map associated with the module. In particular configurations, the reference to the subscriber includes a reference to the location of the timer handler and also a reference to the timer parameters to be passed into the timer handler, operable with a dispatch command, described further below. The local timer map includes an entry indicative of the subscriber including the timer handler within the module, and the global timer map includes an entry indicative of the module. The reference to the subscriber is a dynamic offset from a base to the location in a particular instantiation of the module, the base operable to change upon reenablement of the module. The timer service indexes via the local timer map, a dispatch command operable to dispatch the timer handler upon the expiration and subsequent notification.

As enablement is automatic, the expiration of the timer and resulting timer initiated invocation of the timer handler is independent of the enablement of the subscriber including the timer handler. The timer service determines if the module is disabled by employing the global timer map to find the entry corresponding to the timer expiration to determine the identity of the module corresponding to the timer event, and determining, from the identity of the module (i.e. the IOR), if the module is disabled.

Timer subscriptions are further operable to indicate periodic and aperiodic expiration times. Also, receiving the subscription may encompass subscriptions from multiple subscribers in the module, in which each subscriber is operative to include a timer handler. In such an instance, in response to detecting expiration of the timer, the timer service enables the disabled module upon expiration of a timer subscribed to by any of the multiple subscribers. In another configuration, a first subscription includes a timer identity, and the timer service receives a second subscription to the same timer as first subscription, in which the timer is identified by a timer name provided by both the first subscription and the second subscription. Such a subsequent subscription may further reset the expiration time value with an expiration time value from a second subscription for the same timer.

The enablement of modules in response to timer expiration corresponds to activation of a corresponding component by an activation mechanism, and disabling corresponds to deactivation of the corresponding component by the activation mechanism. The activation and deactivation operations operable to reduce memory consumption by inactive components and provide selective invocation to maintain availability of the component.

In the particular exemplary configuration, the system of the invention may be deployed in a language such as C++, in which enabling modules corresponds to activation of a corresponding component by an activation mechanism, and disabling corresponds to deactivation of the corresponding component by the activation mechanism. Such activation and deactivation operations are operable to reduce memory consumption by inactive components and provide selective invocation to maintain availability of the component. The enabling and disabling is performed at a level of granularity of the modules, in which each of the modules corresponds to a component and is operable be enabled and disabled by activation and deactivation of the corresponding component.

Such a deployment associates the timer event identity with a timer handler in the native language of the timer handler and corresponding subscriber (i.e. C++), and avoids a corresponding definition in an external interface language, in which the external interface language is employed to generate timer event specific code. A particular external interface language is the Object Management Group Interface Definition Language (OMG/IDL), which, while providing a robust interface for external entities and testing purposes, may contribute to undesirable overhead and footprint requirements.

In alternate configurations, each of the modules is operable to include a plurality of threads, and disabling is performed by a thread manager operable to gracefully terminate each of the threads prior to deactivation. Deactivation in this manner occurs by informing each of the threads of the termination and computing when each thread has attained a termination point.

To allow on-demand component disablement (deactivation, or passivation), the component's threads support cooperative thread cancellation. Accordingly, the component framework creates an instance of the Adaptive Communications Environment (ACE) Thread_Manager class in every component, as is known to those of skill in the art. This manager controls all non-ORB threads running within that component. The component framework provides two threading classes (Thread and Task) that seamlessly integrate the component's thread manager, responsive to the activation manager.

The invention as disclosed above is described as implemented on a computer having a processor, memory, and interface operable for performing the steps and methods for monitoring and processing timer events in an information services network system as disclosed herein. Other embodiments of the invention include a computerized device such as a computer system, central processing unit, microprocessor, controller, electronic circuit, application-specific integrated circuit, or other hardware device configured to process all of the method operations disclosed herein as embodiments of the invention. In such embodiments, the computerized device includes an interface (e.g., for receiving data or more segments of code of a program), a memory (e.g., any type of computer readable medium), a processor and an interconnection mechanism connecting the interface, the processor and the memory. In such embodiments, the memory system is encoded with an application having components that when performed on the processor, produces a process or processes that causes the computerized device to perform any and/or all of the method embodiments, steps and operations explained herein as embodiments of the invention to allow execution of instructions in a computer program such as a Java, HTML, XML, C, or C++ application. In other words, a computer, processor or other electronic device that is programmed to operate embodiments of the invention as explained herein is itself considered an embodiment of the invention.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, with emphasis instead being placed upon illustrating the embodiments, principles and concepts of the invention.

DETAILED DESCRIPTION

Figure 1:
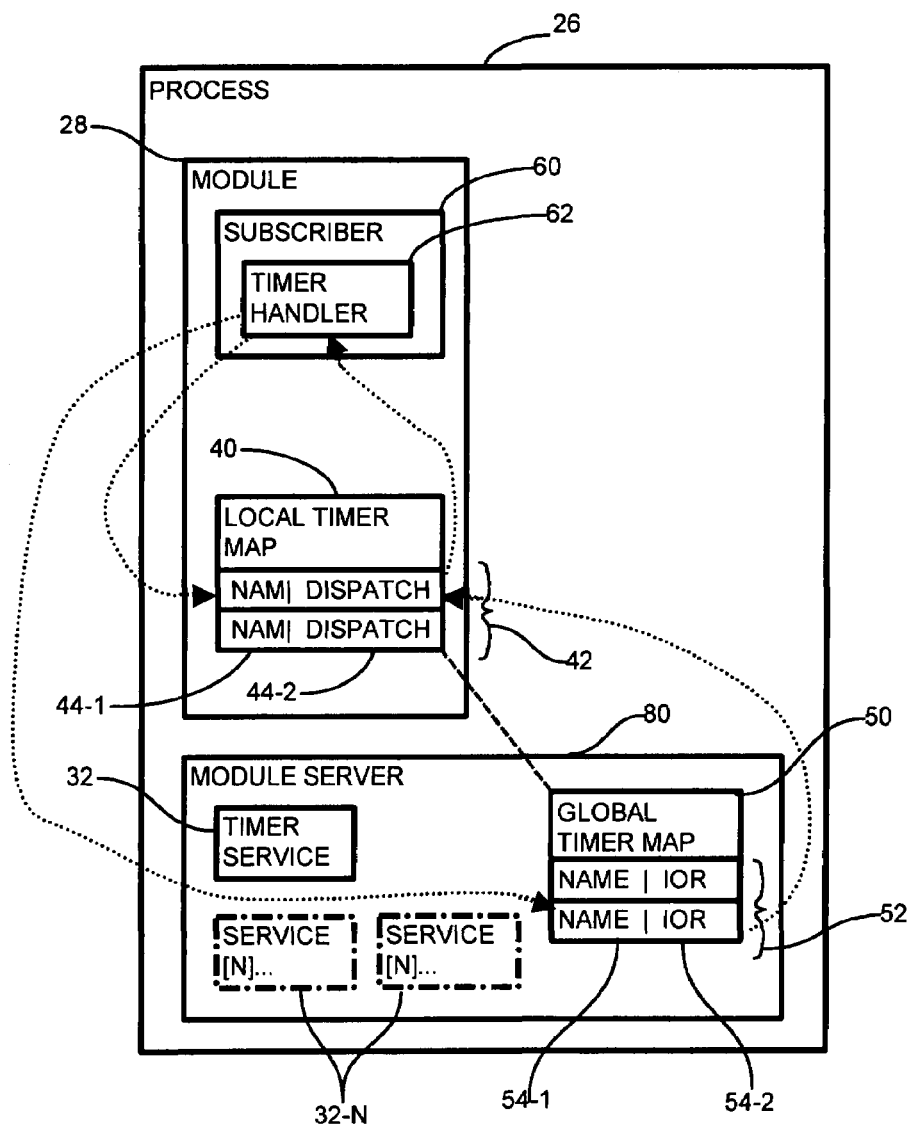
FIG. 1 is a block diagram of a timer handler in a module according to the system of the present invention.

The system of the present invention, therefore, defines a timer service infrastructure in a generalized services architecture. The exemplary timer service architecture disclosed below depicts deployment of modules including subscribers having timer handlers and invocation of the timer handlers via the subscribers containing the timer handlers. Activation and deactivation of the modules having subscribers including the timer handlers occurs automatically, without developer intervention, therefore relieving the developers of designating logic for detecting and controlling activation, or enablement, and passivation, or disablement, of the modules including the respective handlers. Module activation and deactivation, and subscriber invocation to perform the timer handlers occurs via the timer service once defined by the subscription call, discussed further below.

Particular configurations of the invention provide a method for a timer service infrastructure which localizes the timer service view to include only relevant timer events employed by each respective developer, therefore requiring consideration and manipulation of only the pertinent timer definitions and structures for each developer. Configurations of the invention further provide a reporting mechanism which automatically correlates each timer with the corresponding handler upon reporting of the timer by the detector of the timer occurrence, thereby relieving the timer handler of polling and/or casing the timer expiration notifications to determine timer handler invocation.

In particular configurations of the invention, the timer service infrastructure allows a subscriber to set a timer and corresponding handler for invocation upon timer expiration, and optional related timer data. Invocation of the timer includes only the timer parameter specific class definition, in which the infrastructure transparently processes the reporting and invocation. A timer handler, corresponding to the timer definition, performs remedial and responsive processing of the timer. A developer need only subscribe to a timer to identify the appropriate handler, and handler the timer with the timer handler and any related timer data upon timer expiration. Each particular timer avoids extraneous timer definitions and associated files, thereby relieving the developer of burdensome details associated with unrelated timer events.

The timer service, therefore, coordinates timer handler invocation by associating a timer name with each timer which remains specific to the timer. The timer identifier is a commonly typed reference to the timer, which avoids triggering a need to globally inherit all timers by a compilation entity. Therefore, subscribers to the timer event may subscribe prior to publication of the timer event. Further, the timer service identifies and coordinates multiple subscribers, and selectively activates inactive subscribers (modules including subscribers) in response to expiration of a timer. In this manner, the timer service provides a seamless, transparent timer event subscription and handling mechanism employing only the timer class on the user/developer side, avoiding extraneous definitions and minimizing execution footprint while still capturing and queuing active timers on behalf of the subscribers.

In the particular exemplary implementation illustrated in detail below, the timer service infrastructure employs C++ and Common Object Request Broker Architecture (CORBA) entities. The exemplary configuration provides complex software system developers with a user-friendly, resource-conserving, and strongly-typed timer service. The user-friendliness of the timer service stems from its minimal interface, consisting of several API calls: schedule_aperiodic_timer( ), reschedule_aperiodic_timer( ), schedule_periodic_timer( ), reschedule_periodic_timer( ), cancel_timer( ), cancel_all_timers( ), and find_timer. The resource-conserving nature of the timer service stems from its full integration into the component framework, while imposing a limited overhead on framework resources. The strong typing of the timer service stems from its ability to verify at compile-time that the subscribers' classes have appropriate timer handlers.

FIG. 1 is a block diagram of a timer handler in a module according to the system of the present invention. Referring to FIG. 1, in a first exemplary configuration, illustrative of a single timer handler, the timer infrastructure includes the timer handler 62 in a hosting subscriber 60. As timer handlers 62 are methods corresponding to a sequence of steps, or instructions, the timer handlers 62 generally have no state outside of a hosting subscriber 60. The subscriber 60, also having sequences of instructions, is also the entity which sets a timer 42 for invoking the timer handler 62 upon expiration of the set timer 42, discussed further below. In the exemplary configuration, the subscriber 60 setting the timer 42 includes the corresponding handler 62, however alternate configurations may allow timers 42 to be set by other subscribers 60.

A module 28 includes one or more subscribers 60. Each module 28 also includes a local timer map 40 including timer entries 42 for subscribers 60 in the module 28. Such a module 28, also known as a component in particular deployment environments such as a C++ environment, is operable for enablement and disablement as a unit including each subscriber therein. Therefore, enablement and disablement, (i.e. activation and passivation) discussed herein refers to a particular module 28 and all included subscribers 60.

It should be noted that the exemplary configuration disclosed herein employs a C++ development environment. In such an environment 10, the description herein as applied to the software entities process 26, module 28, subscriber 60, and timer handler 62 employ technically operative language within the C++ development environment. These entities interoperate according to certain principles and deployment details according to the C++ language. Specifically, processes include one or more modules (components), which may be disabled, or passivated, as a whole. Each module 28 includes one or more subscribers (entities), which are instantiated with the module and may occupy several locations in memory as separate instantiations. The timer handlers 62 are methods invoked, or referenced by the subscribers 60. The timer handlers represent, in the exemplary configuration, methods including only sequence of instructions of reentrant code located at a particular position in memory and invoked by a plurality of instantiated subscribers. Accordingly, in the C++ development environment, a particular timer handler occupies a logical existence only in the context of an instantiated, or corresponding, subscriber, as the description herein makes clear. Alternate implementation and deployment platforms may employ alternate invocation and instantiation practices, such as instantiating an timer handler in entirety within the address space of each instantiated subscriber.

A process 26 includes one or more modules 28, and a module server 80. The module server 80 includes a global timer service 32, corresponding to the modules 28 in the process 26, and a global timer map 50, operable to store timers 52 for each module 28 in the process 26. The module server 80 is also operable to store other services 32-N as well, in accordance with the services architecture discussed further below. In particular, the module server 80 is adapted to include an event service, operable in conjunction with the timer service 32, as disclosed in copending U.S. patent applications entitled "SYSTEM AND METHODS FOR EVENT SERVICES," application Ser. No. 10/750,277 and "METHODS AND APPARATUS FOR PROVIDING EXTENSIBLE LIGHTWEIGHT SERVICES IN A DATA STORAGE ENVIRONMENT" application Ser. No. 10/750,334, both assigned to the assignee of the present application and filed concurrently with the present application, incorporated herein by reference in entirety.

In operation, the subscriber 62 sets a timer 42 by invoking a call to a schedule method. Such scheduling is either periodic or aperiodic. The timer service 32 stores a timer entry 42 in the local timer map 40, and also stores a timer entry 52 in the global, or persistent, timer map 52. The global timer map 52 stores the identity, or IOR, of the module 28 including the timer, and persists throughout disablement of the module 28. The local timer map 42 stores the identity of the subscriber 60 having the timer handler 62 within the particular module 28, operable for use with the dispatch command, described below. In both the local timer map 40 and the global timer map 50, the timer is referenced by a timer name (44-1, 54-1 respectively), or key, which may be set by the subscriber 60 when setting the timer. Upon expiration of the timer, the timer service 32 identifies the module 28 via the global timer map 50, and enables the module 28 if necessary. The timer service 32 identifies the module by the name 54-1 of the expired timer to determine the entry 52 including the IOR 54-2 of the module 28 including the subscriber 60. The now enabled module 28 identifies the timer entry 42 in the local timer map 40, and invokes the subscriber 60 including the timer handler 62, which triggers the subscriber to perform the corresponding timer handler 62.

With respect to implementation, in the exemplary configuration discussed in further detail below, the timer service participants are timers and subscribers to these timers. The subscription for a timer proceeds as follows: The subscriber class (subscriber 60) defines the timer handler 62 as a member function for handling the timer events:

void handle_timeout(const Timer_Params&)

A subscriber instance is then passed as an argument to one of the schedule( ) or reschedule( ) API calls along with a name for the timer, notifying the timer service that the subscriber instance is ready to handle the timers through the aforementioned timeout handler. The timer service informs the subscriber about the nature of the timer event through an instance of the Timer_Params class, which the timer service upcalls to the timeout handler. The Timer_Params class carries the following information: timer name, scheduled time, published (i.e. expiration) time, delay, and period (for aperiodic timers).

The APIs for scheduling timers have been split into aperiodic and periodic timers, to reflect a significant semantic difference between these two timers: whereas the timer service automatically cancels aperiodic timers after their publication, developers must always invoke the cancel_timer( ) API call to cancel periodic timers. Thus, aperiodic timers may only be meaningfully cancelled before publication occurs, but they need not be cancelled after publication. Timers can either be scheduled or rescheduled. When a timer is scheduled in a component's initialize routine, both the original delay and period, if available, are preserved across component activation and passivation. Consequently, scheduled timers are independent of components' activation or passivation. In contrast, when a timer is rescheduled, both the delay and the period are reinitialized, and can be modified arbitrarily.

The timer service and the event service, described in the copending U.S. patent application cited above, address complementary concerns. A timer, identified by the timer's name, is delivered to a single subscriber. Moreover, any attempt to schedule another timer should reference a different name. In contrast, multiple subscribers may subscribe to multiple user events, which can be used to disseminate information across multiple components or component server processes. Combining these two services, the timer service and the event service, may provide substantial processing capability and efficiency: the timer service keeps track of time on behalf of a specific subscriber, which may publish a timer initiated event using the event service.

Figure 2:
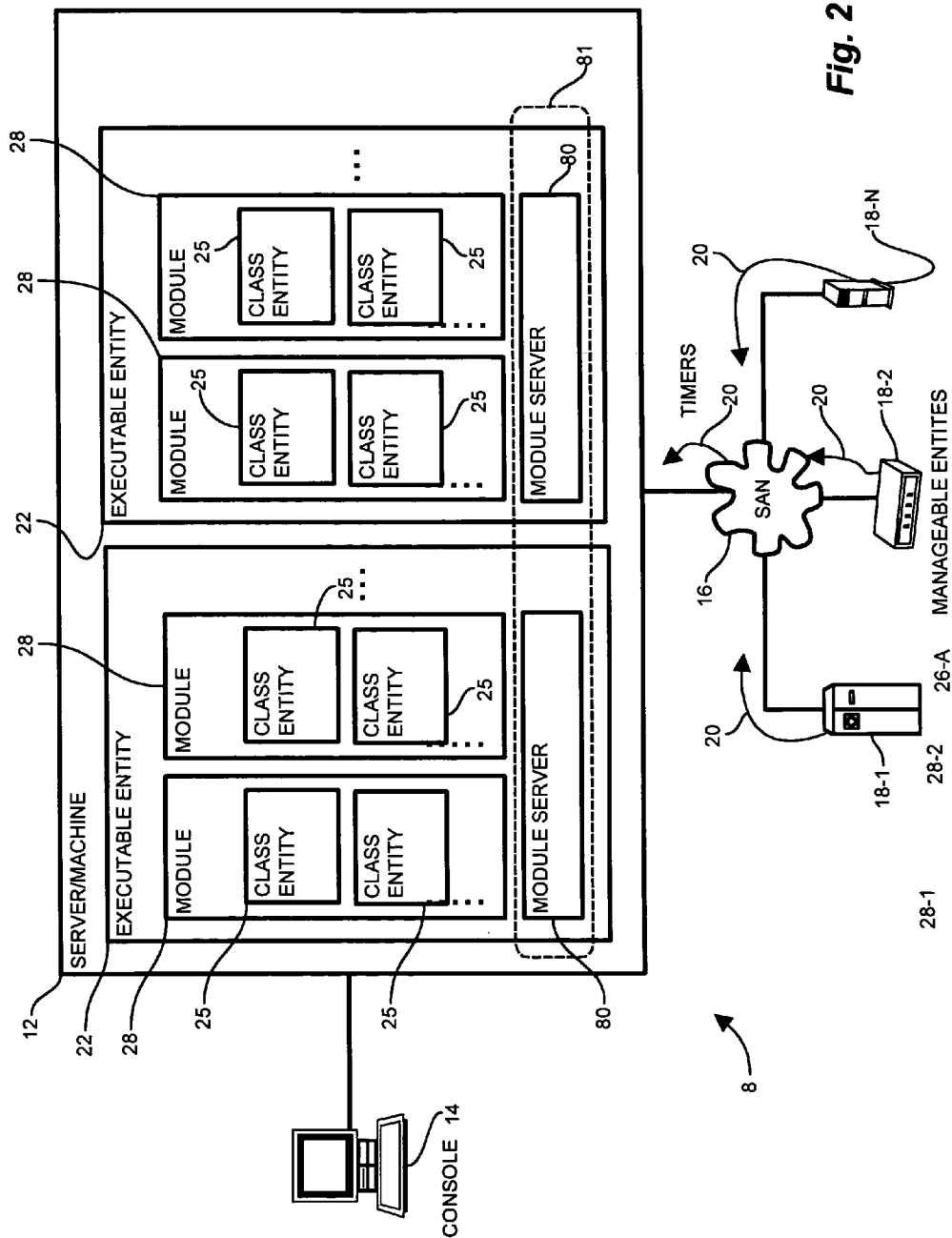
FIG. 2 is a context diagram of an exemplary managed information infrastructure environment including a storage area network and suitable for use with the timer service infrastructure of the present invention.

FIG. 2 is a context diagram of an exemplary services architecture 8 including a storage area network (SAN) 16 and suitable for use with the timer service infrastructure of the present invention. Referring FIG. 2, the services architecture 8 includes a computer system server 12 in communication with a user console 14 and connected to a network 16 such as a storage area network (SAN) 16. The network 16 interconnects a plurality of manageable entities (MEs) 18-1 . . . 18-N (18 generally), such as mass storage devices, switching devices, and agents. Each of the manageable entities 18 is operable to send timer messages 20 via the network to the server 12.

The server 12 is a microprocessor based computing device having a memory and interfaces (not specifically shown) and operable for communication with other such devices 12, 18, as is known to those of skill in the art. The server 12 is operable for performing executable entities 22, or processes, each containing one or more modules 28, or components. Each module 28 is operable to include a plurality of class entities 25, which are instantiations of classes defined by a software source code base (not specifically shown). The class entities 25, therefore, represent codified (i.e. coded) sets of attributes and methods (i.e. instructions), which the modules 28 inherit. Note that class entities 25 may inherit other class entities 25, therefore defining an inheritance hierarchy (not specifically shown) of the methods and attributes therein. The executable entities 22 include modules 28 according to performance and design considerations, and perform the methods using the attributes therein. Each executable entity 22 typically includes multiple modules 28 according to performance and design considerations of executable entity footprint (i.e. memory and processing demands) weighed with functionality and robustness of a particular executable entity 22 (process), such as the methods available to that executable entity.

The class entities 25 in the services architecture 8 include, in exemplary arrangements of the invention discussed below, subscribers entities and timer handlers (described further below), in addition to other class entities 25 for performing (executing) other operations in the scope of a particular executable entity 22. A subscriber entity includes a timer handler entity (discussed further below). In the infrastructure 10, developers select class entities 25 for inclusion in a module 28 for performing a particular task or operation. The developers then select modules 28 for inclusion in the executable entities 22 on the particular server 12, according to performance and throughput requirements, as discussed above. For example, failure or unexpected termination of a module 28 typically terminates the executable entity 22 in which it performs. Accordingly, it may be beneficial to place a suspect module 28 in its own executable entity 22 to avoid disrupting other modules 28 which would otherwise be terminated as well with the executable entity 22. Conversely, each executable entity 22 consumes footprint overhead, so efficiency suggests combining multiple modules 28 per executable entity 22. There are other considerations.

The architecture 8 (infrastructure) therefore provides for development and deployment of multiple executable entities 22 each having multiple modules 28 for performing particular tasks in the server 12. In such an architecture, particularly when a large number of executable entities 22 including many modules 28 are concerned, it is beneficial to insulate individual developers from details of other executable entities 22 and modules 28.

In a large complex system, such as the SAN 16 environment operable to be supported by the architecture 8, many timer events may occur and have a need to be identified to trigger responsive operations. Certain class entities 25 (subscribers) have an interest in particular timer events and have timer handler entities including instructions (methods) for responsive action to such a timer. In the exemplary implementation, either a dynamically linked library that implements the timer service or an implementation of the timer service that is fully integrated into the component server may be employed. The class entities 25 in FIG. 2 are software based entities included in a module 28 as described in FIG. 1. Therefore, the general architecture 8 disclosed in FIG. 2 depicts deployed class entities 25 which may, in particular configurations of the services architecture 8, be a subscriber 60 as in FIG. 1 or other user software entity.

It should be noted that the exemplary configuration disclosed herein employs a C++ development environment. In such an environment, the description herein as applied to the software entities process 26, module 28, subscriber 60, and timer handler 62 employ technically operative language within the C++ development environment. These entities interoperate according to certain principles and deployment details according to the C++ language. Specifically, processes 26 include one or more modules 28 (components), which may be disabled, or passivated, as a whole. Each module 28 includes one or more subscribers 60 (a subset of class entities 25), which are instantiated within the module 28 and may occupy several locations in memory as separate instantiations. The timer handlers 62 are methods invoked, or referenced by the subscribers 60. The timer handlers 62 represent, in the exemplary configuration, methods including only sequences of instructions of reentrant code located at a particular position in memory and invoked by a plurality of instantiated subscribers 60. Accordingly, in the C++ development environment, a particular timer handler 62 occupies a logical existence only in the context of an instantiated, or corresponding, subscriber 62, as the description herein makes clear. Alternate implementation and deployment platforms may employ alternate invocation and instantiation practices, such as instantiating a timer handler 62 in entirety within the address space of each instantiated subscriber 60.

The integrated implementation is, therefore, transparent to the component developers. The component framework provides a multithreaded ACE Task for each component, enabling the subscribers to handle timers therein transparently. To simplify both the design and the usage of the timer service 32, the framework requires that the timer subscribers be deleted only upon component destruction.

The timer service 32 activates a module 28 within the module server 80 as follows: The module's 28 DLL is first loaded into the module server 80; next, a servant factory, provided by the DLL, creates the modules's servant; finally, that servant incarnates the module's CORBA object. Conversely, a module 28 (component) is passivated or deactivated by etherealizing the CORBA object and unlinking the modules's DLL from the component server.

Figure 3:
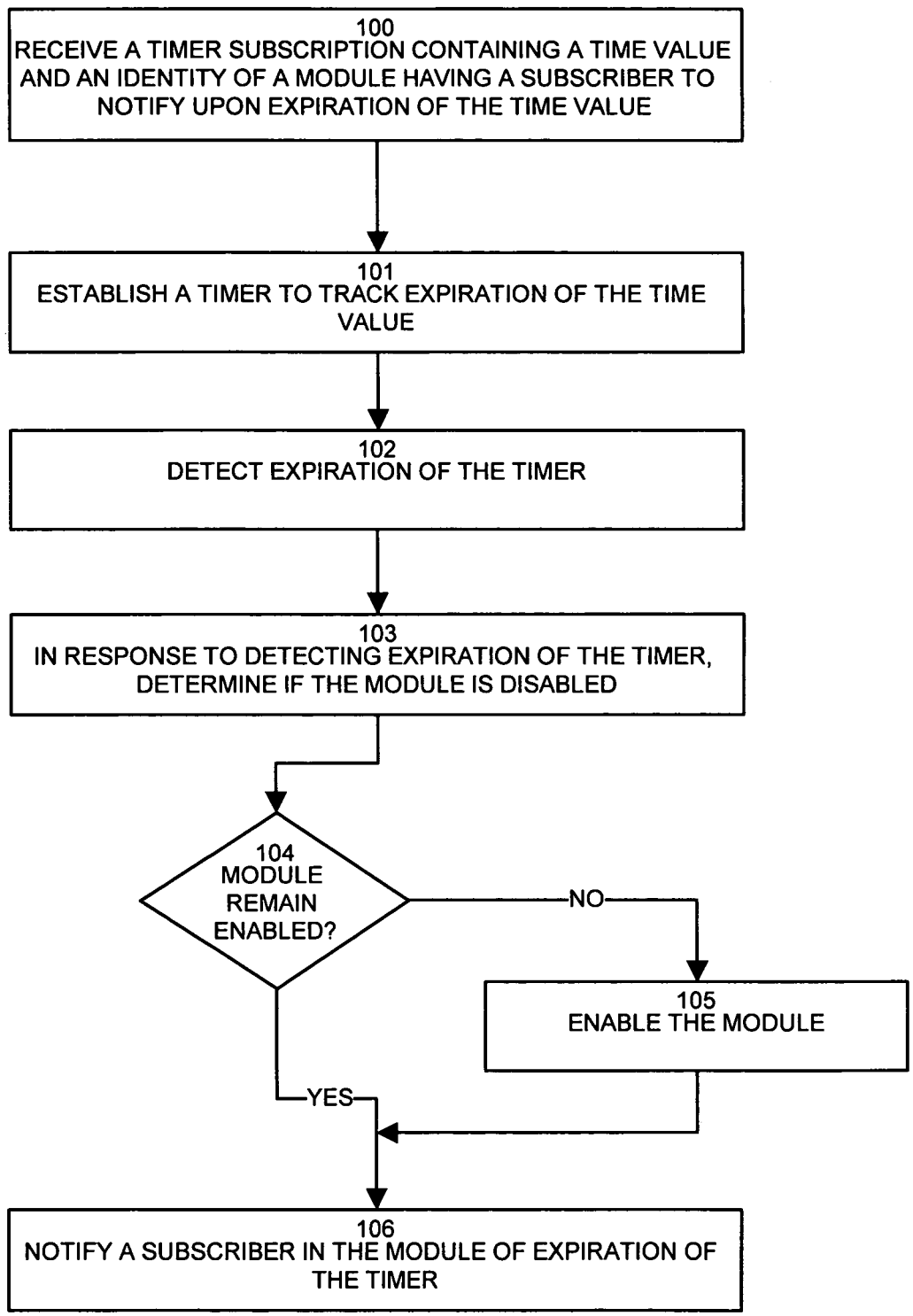
FIG. 3 is a flowchart of timer event subscription and publication as described herein.

FIG. 3 is a flowchart of timer subscription and publication (expiration) as described herein. Referring to FIGS. 1, 2 and 3, the method for processing timer events includes receiving a timer subscription containing a time value and an identity of a subscriber and module to notify upon expiration of the time value. For example, in a SAN management application, a typical exemplary timer event may be a statistical gathering at periodic intervals, such as throughput volume and storage area consumed. Other exemplary timer events include periodic backup and archive. In alternate arrangements, such timer events may also optionally include timer event data with the timer event publication which quantifies or qualifies.

The timer service establishes a timer to track expiration of the time value, as depicted at step 101, by storing the timer event information in a timer table, described further below. Module processing continues until the timer service 32 detects expiration of the timer 52, as shown at step 102. The timer expiration results from lower level system calls, typically interrupt driven, triggered by the operating system or other housekeeping operation.

In response to detecting expiration of the timer, the timer service 32 determines if the module 28 including the subscriber 60 to the expired timer is disabled, as depicted at step 103. During normal processing, following step 101, the module server 80 enables and disables modules 28 for various reasons. Accordingly, the timer service 32 performs a check to determined if the module 28 is disabled, as depicted at step 104 and if so, selectively enables the module 28 at step 105.

The module server 80 enables and disables modules 28 at various points in processing. Such disablement, or passivation, may occur for performance reasons if the module service 80 determines that the module 28 will be idle, or upon selection of the module itself. Other causes of disablement occur.

At step 106, following enablement at step 105, or from step 104 if the module is already enabled, the timer service 32 notifies the timer subscriber in the enabled module 28 of expiration of the timer, so that the subscriber 60 may invoke the timer handler 62.

Figure 4:
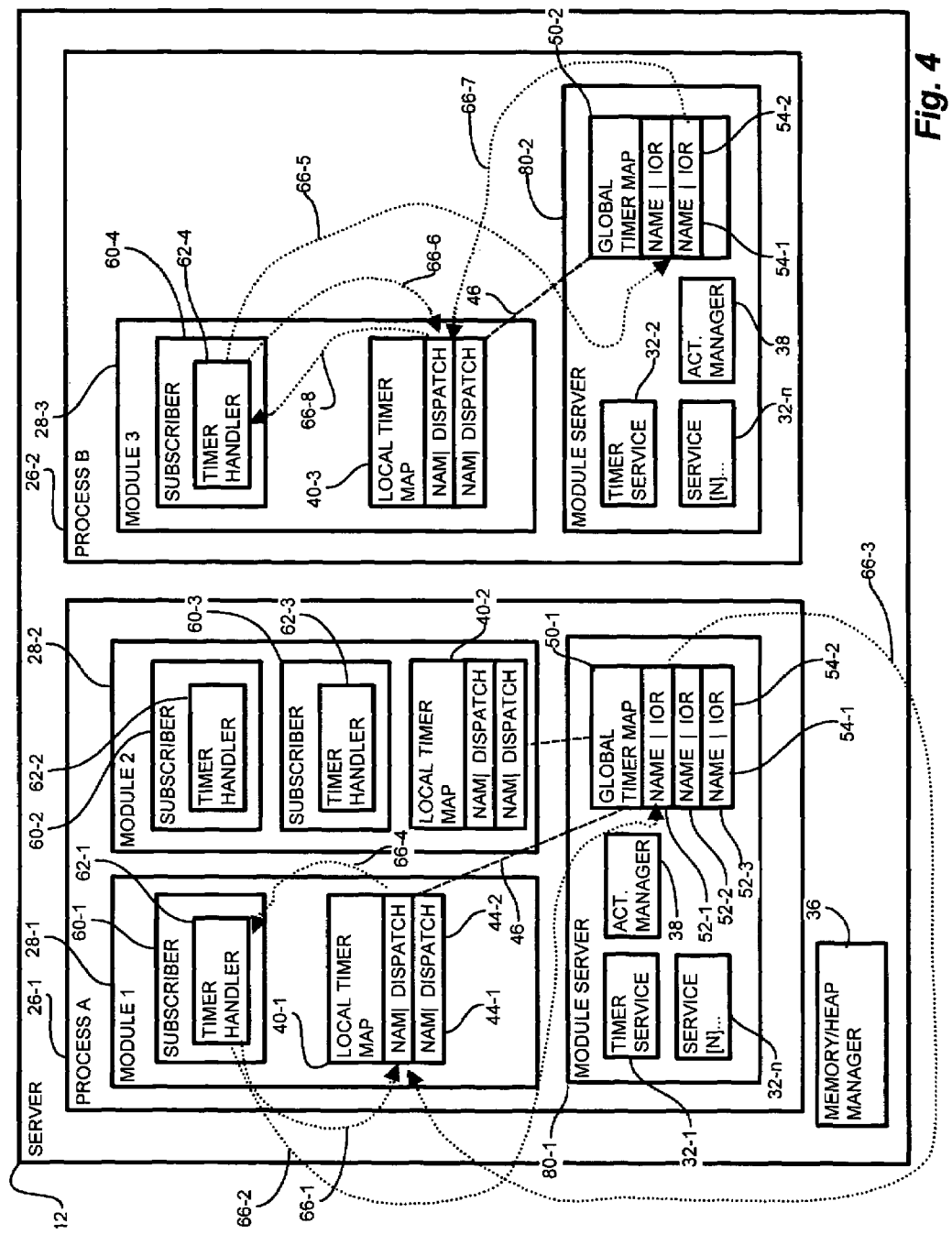
FIG. 4 is a block diagram of the timer service as in FIG. 2 in a server in the managed information environment of FIG. 1 employing multiple subscribers and timer handlers.

FIG. 4 is a block diagram of the timer service 32 in a server 12 in the managed information architecture 8 of FIG. 2 employing multiple subscribers 60 and timer handlers 62. Referring to FIG. 4, in a particular exemplary configuration of the invention, the server 12 includes the processes 26A (process A) and 26B (process B) as executable entities 22. Process A includes modules 28-1 and 28-2, and process B includes module 28-3 (28 generally). In the particular exemplary configuration, the modules 28 are components according to a deployment language such as C++, as is known to those of skill in the art. The timer service 32 includes entities 25 shown by dotted lines 30, and includes the local timer service 32 residing in each module 28, shown as instantiations 32-1 . . . 32-3 (32 generally), a memory/heap manager 36 and an activation manager 38.

As shown above, the local timer service 32 resides in each module 28, as will be discussed further below. Each instantiation 32-1 . . . 32-3 includes a local timer map 40 having entries 42. Each local timer event map 40 entry 42 includes the attributes: timer ID 44-1 and dispatch command 44-2. The global timer map 50 including the attributes, timer event ID 54-1 and Interoperable Object Reference (IOR) 54-2, tracks each of the entries 42 in the local timer map 40 by the respective timer ID 44-1 and 54-1, shown by dotted lines 46.

Each of the modules 28 includes class entities 25, specifically subscribers 60 and timer handlers 62. Each subscriber 60 employing the timer service includes at least one timer handler 62. Specifically, subscribers 60-1 . . . 60-4 include timer handlers 62-1 . . . 62-4, respectively. Therefore, the modules 28 include subscribers 60 to a timer, shown by timer entries 52, which include timer handlers 62, which are instructions (methods) responsive to the timer event 52, which the timer service 32 triggers upon expiration of the corresponding timer.

In operation, the subscriber 60-1, for example, including the timer handler 62-1, subscribes to a timer 52. The subscription creates an entry 42 in the local timer event map 40, shown by arrow 66-1, containing the association of timer name 44-1 and corresponding timer handler via a dispatch command 44-2, described further below. The subscription also creates another entry 52 in the persistent timer event map 50, associating the timer ID 54-1 with the IOR 54-2 identifying the subscribing module 60-1, as shown by dotted line 66-2. Therefore, the timer name 54-1 also establishes a mapping from the persistent timer event map 50 to the module 28-1-1 via the IOR 54-2, shown by dotted line and from the local timer event map 40 of the referenced module 28-1 to the subscriber 60-1 and corresponding timer handler 62-1 via the local dispatch command 44-2, shown by dotted line 66-4. An analogous relation in process B 26-2 exists from the timer handler 62-4 to the global timer map 50-2, shown by arrow 66-5, and from the timer handler 62-4 and corresponding subscriber 60-4 to the local timer map 40-3. Further, the handler 62-4 invocation is shown from the IOR 54-2, via timer name 54-1, to the subscribing module 28-3 by dotted line 66-7, and from the local timer map 40-3 to the timer handler 62-4 and corresponding subscriber 60-4, shown by dotted line 66-8.

Figure 5:
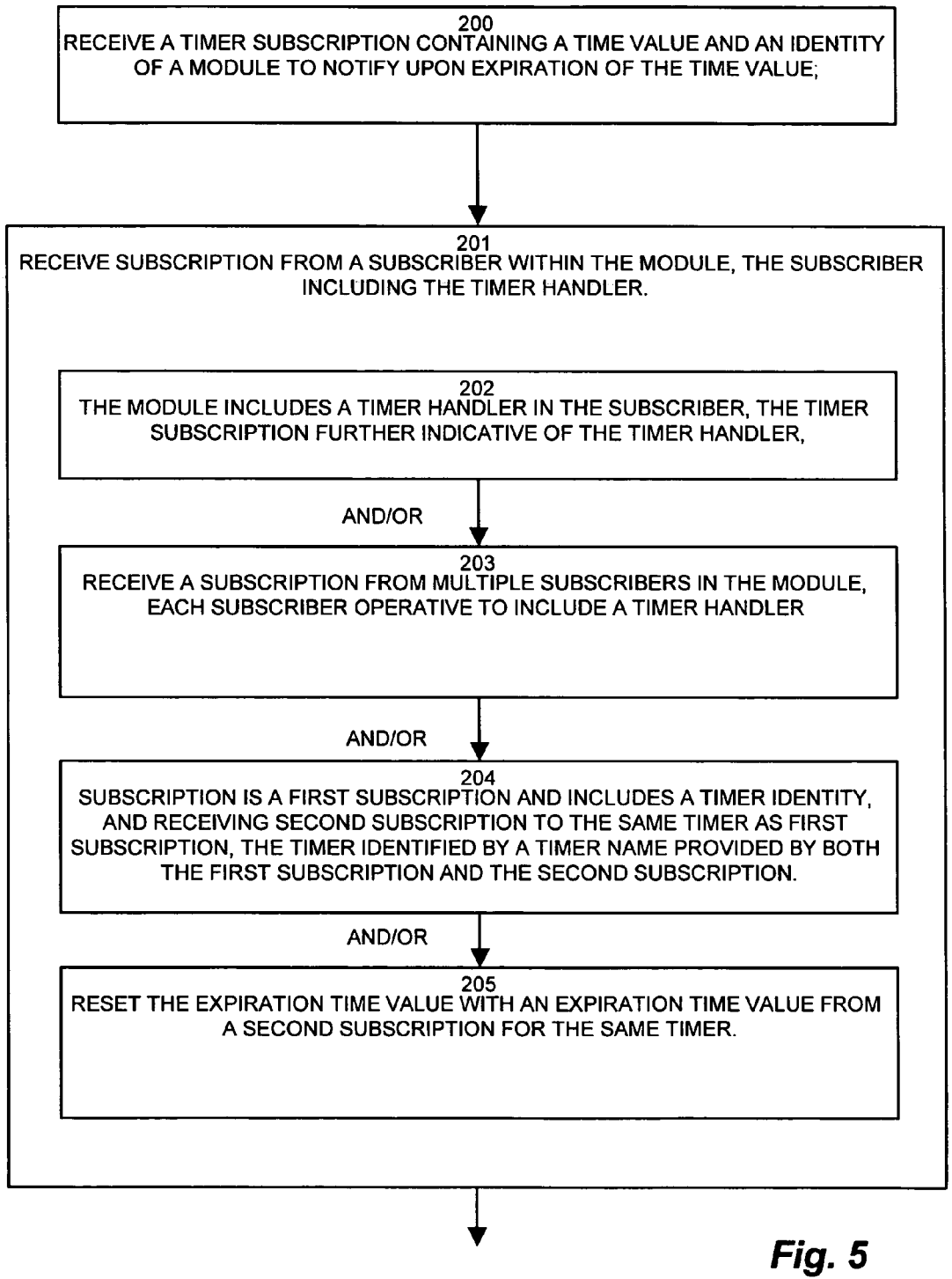
FIGS. 5-8 are a flowchart of subscribing and handling a timer event in the system of the present invention.
Figure 6:
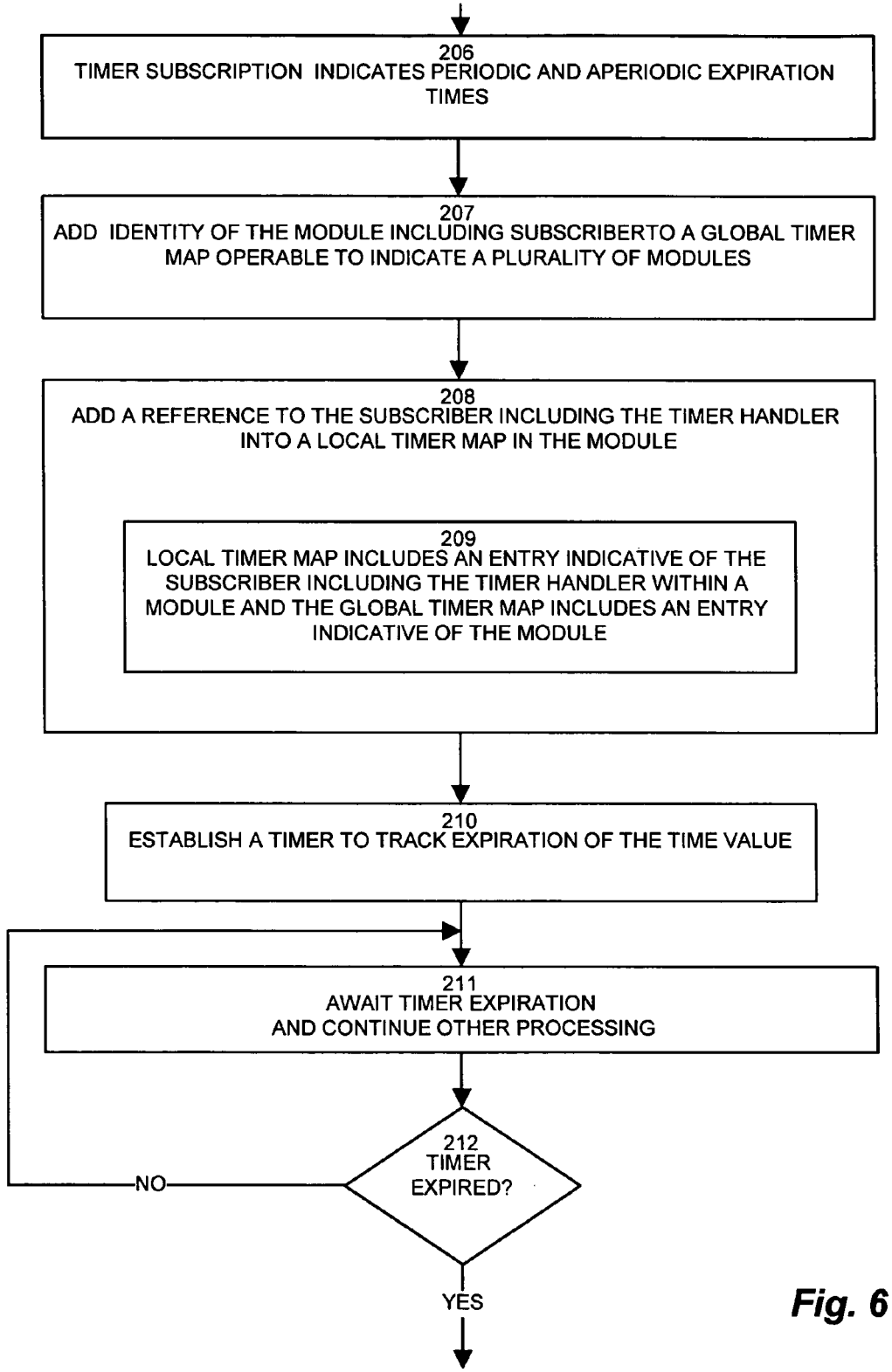
Figure 7:
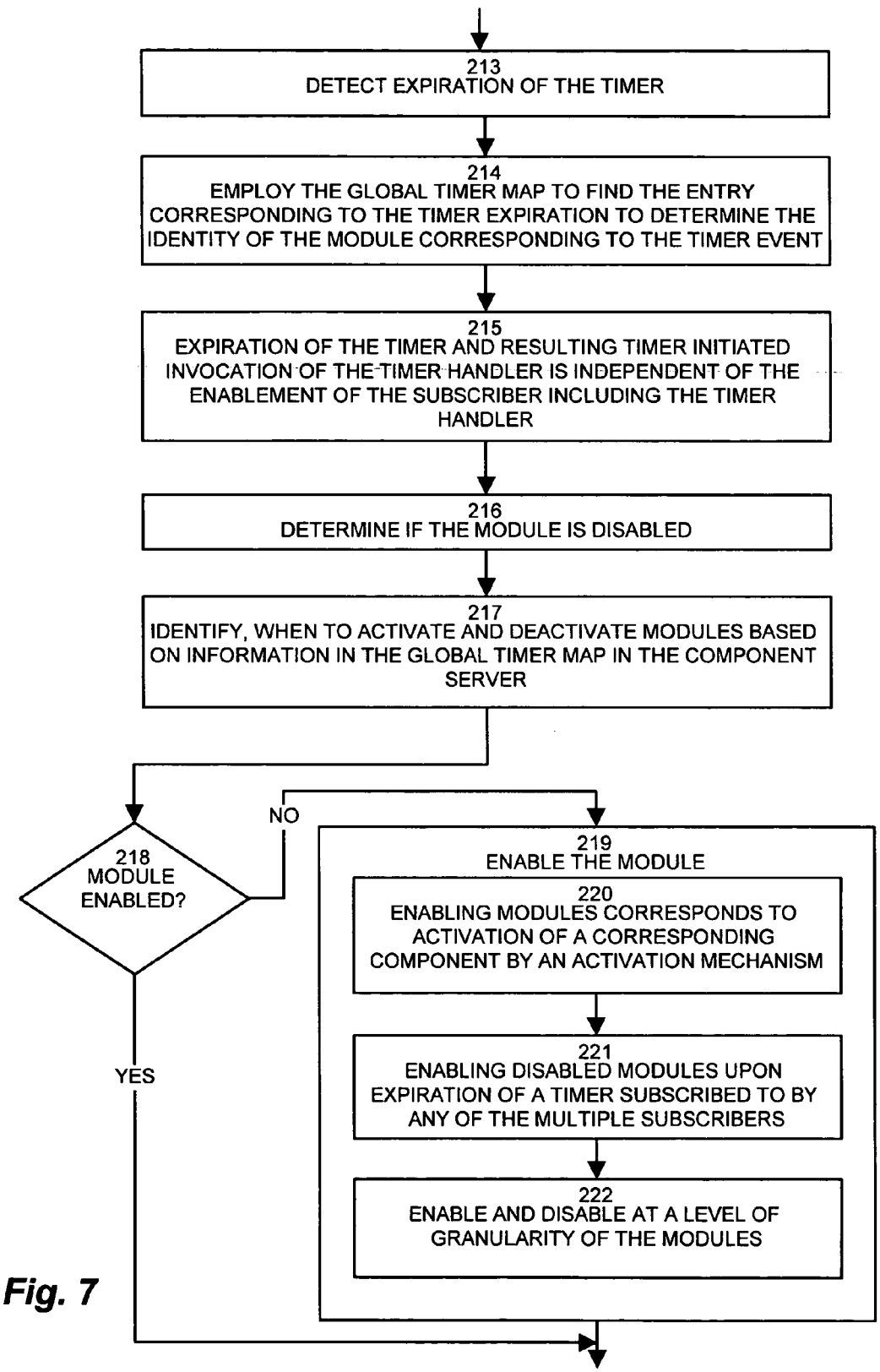
Figure 8:
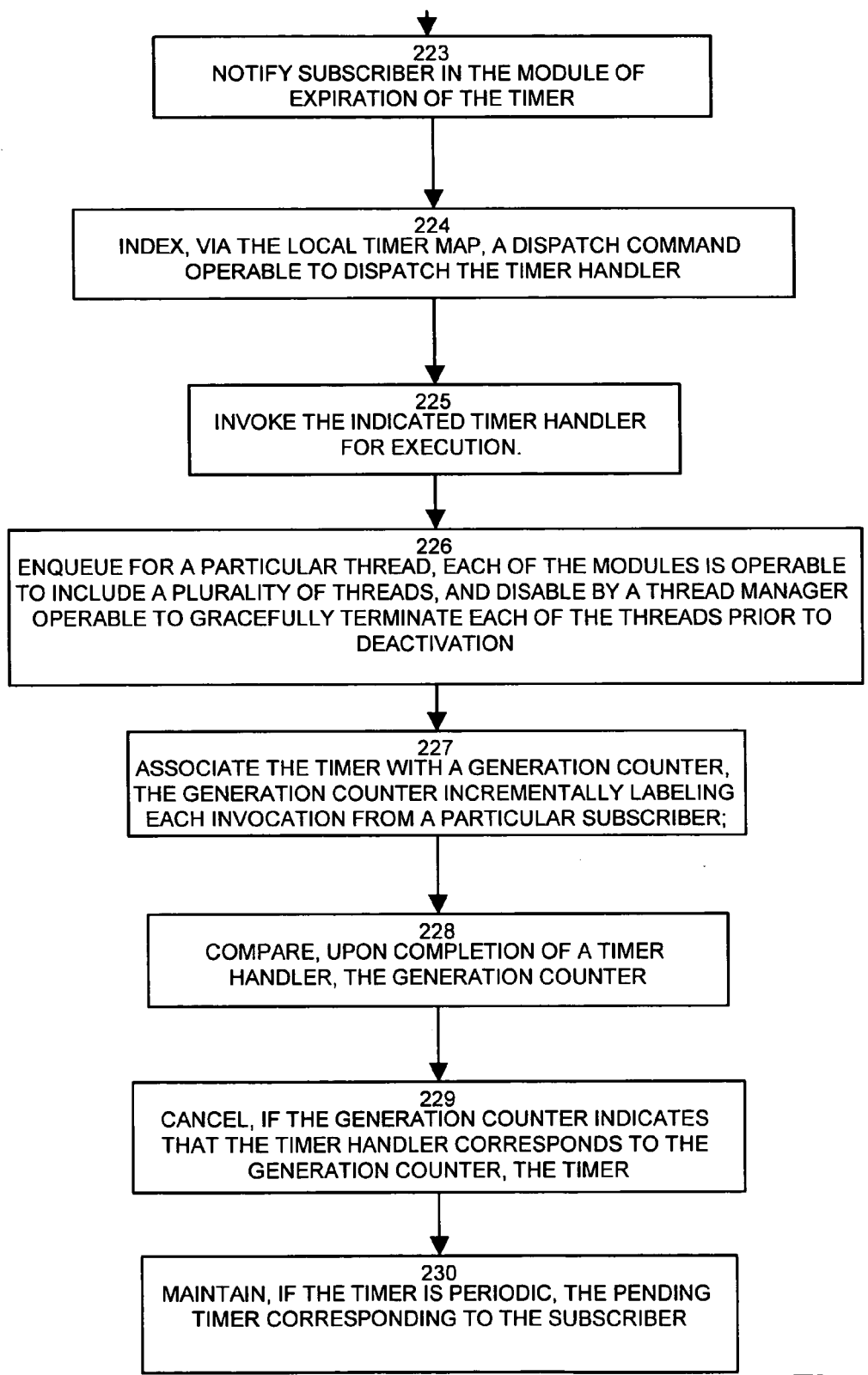

FIGS. 4-6 are a flowchart of subscribing and handling a timer event 52 in the system of the present invention, as discussed in FIG. 2, in greater detail. Referring to FIGS. 4-6, at step 200, the timer service 30 receives a timer subscription containing a time value and an identity of a subscriber 60 and module 28 to notify upon expiration of the time value. As indicated above, each subscriber 60 to a timer 52 resides in a module 28, and accordingly, the timer service 32 receives each subscription from a subscriber 62 within the module 28, in which the subscriber 60 includes the timer handler 62, as depicted at step 201.

In particular configurations, timer subscriptions occur according to several scenarios, described in steps 202-205 below. At step 202, the module 28 includes a timer handler 62 in the subscriber 60, in which the timer subscription further indicative of the timer handler 62. Notification of the subscriber of the expiration of the timer further involves invoking the indicated timer handler 62 for execution by the subscriber 60.

At step 203, the timer service receives subscriptions from multiple subscribers in the module. As indicated above, each subscriber includes a dedicated timer handler 62. Accordingly, the subscription by each subscriber will result in triggering (invoking) the respective subscriber and corresponding timer handler.

In alternate configurations, the subscription is a first subscription and includes a timer identity. The timer service successively receives a second subscription to the same timer as first subscription. Each timer 54 includes a timer name, or key, as a timer parameter. The second subscriber effectively references the timer identified by the timer name provided by both the first subscription and the second subscription, as depicted at step 204. Such a second reference may, subject to ownership, security, and privilege concerns, manipulate the timer because the subscriber references the timer 42, 52 by name 44-1, 54-1. At step 205, such a successive reference resets the expiration time value with an expiration time value from a second subscription for the same timer 42, 52. Alternate configurations may employ other modifications and adjustments to existing timers via the timer name, or key.

The timer subscription is operable to indicate periodic and aperiodic expiration times. Periodic timers recur on a regular basis according to a period, such as every two hours or daily at a particular time. Such daily timers lend themselves well to housekeeping tasks such as gathering statistical performance data or daily backups. Aperiodic timers, in contrast, expire once and need be explicitly reset. Accordingly, at step 206, the timer service determines if the subscription includes a periodic or aperiodic time value.

The timer service 32 determines the identity of the module including the subscriber of the timer, as indicated at step 207. The timer service 32 records the module 28 identity because enablement and disablement occurs on a per module basis. The timer service 32 adds the identity of the module 28 to a global timer map 50, in which the global timer map operable to indicate a plurality of modules 28. The global timer map 50 stores module 28 information for each process 26, and occupies the module server 80 of each process. The timer service 32 stores entries 54 the global timer map 50 including the timer name 54-1 and the IOR 54-2 of the module 28. The timer name, in the exemplary configuration, employs an ASCII string which operates to identify and distinguish the timer from other timers in the sane or other subscribers 60. The IOR is a reference, or handle, to each module 28 for which a timer exists, and is employed in the exemplary configuration by C++ and the CORBA components, discussed above, to facilitate enablement and disablement of the modules 28. Alternate implementations may employ alternate module 28 or component reference and/or activation mechanisms.

Each module 28 also includes a local timer map 40, indicative of pending timers for that module 28. Accordingly, at step 208, the timer service 32 adds a reference to the subscriber 60 including the timer handler 62 into a local timer map 40 associated with the module 28, for use with the dispatch command. The timer service 32 employs the local timer map 40 for locating the subscriber 60 and handler 62 in the module 28 after identifying the module 28 from the global timer table 50. Accordingly, the local timer map 40 includes an entry 42 indicative of the subscriber 60 including the timer handler 62 within a module 28, and the global timer map 50 includes an entry 52 indicative of the module 28, as depicted at step 209. The local timer table 40 also includes the timer name 44-1, and a reference to the subscriber 44-2 corresponding to (i.e. the subscriber 62 which set) the timer. The timer entry 42 in the local timer table 40 includes a reference to the subscriber which is a dynamic offset from a base to the location in a particular instantiation of the module. The base is operable to change upon reenablement of the module, hence the global timer table 50 maps to the module 28, and the local timer table 40 enables mapping to the subscriber despite intervening disablement.

The timer service 32 then establishes the timer to track expiration of the time value specified by the subscriber 62 in the subscription request, as depicted at step 210. The timer is typically an interrupt or scheduler based function native to the operating system, as is known to those of skill in the art.

Conventional timer based interfaces integrate with the application requesting such timer support via an interface package or class which generates additional and/or extraneous code definitions, which may or may not be beneficial to the application development under all circumstances. In the particular exemplary configuration disclosed, the association of the timer identity with a timer handler 62 occurs in a native language of the timer handler (i.e. C++, in the exemplary configuration) and corresponding subscriber, and avoids a corresponding definition in an external interface language, the external interface language for generating timer specific code. One such external interface language is the Object Management Group Interface Definition Language (OMG/IDL), which supports automated code generation derived from the use of the interface definition.

The processes 26 on the server 12 pursue normal processing while awaiting expiration of the timers 52, as depicted at step 211. The timer service 32 undergoes a periodic check, as depicted at step 212, to determine expiration of a timer, and control reverts to step 211 for normal (non-timer driven) processing. It should be noted that the check at step 212 does not imply a polling mechanism, although polling is one available implementation. Rather, the timer service responds to interrupt or schedule driven events as described above.

At a successive point during processing, the timer service 32 detects expiration of the timer, as depicted at step 213. The timer service 32 employs the global timer map 50 to find the entry 52 corresponding to the timer expiration to determine the identity 54-2 of the module 28 corresponding to the timer event 52. As indicated above, the expiration of the timer 52 and resulting timer initiated invocation of the timer handler 62 is independent of the enablement of the module 28 having the subscriber 60 including the timer handler 62, as depicted at step 215. Rather, at step 216, the timer service determines, from the identity 54-2 of the module 28, if the module 28 is disabled, as shown at step 216.

The module server 80, in response to the timer service 32, identifies when to activate and deactivate modules based on the information in the global timer map 40, as depicted at step 217. Accordingly, in response to detecting expiration of the timer, the timer service 32 determines if the module 28 is disabled, as shown in the check at step 218, and if the module 28 is disabled, enabling the module 28, as depicted at step 219. Such enabling of the module 28 corresponds to activation of a corresponding component by an activation mechanism, as shown at step 220. Similarly, disabling corresponds to deactivation of the corresponding component by the activation mechanism, the activation and deactivation operations operable to reduce memory consumption by inactive components and provide selective invocation to maintain availability of the component.

Further, as indicated above, the timer service 32 may receive a time subscription from multiple subscribers 60 in the module 28, each subscriber 60 operative to include a timer handler 62. In such a scenario, the timer service 32, response to detecting expiration of the timer, enables disabled modules 28 upon expiration of a timer subscribed to by any of the multiple subscribers 60 in the module 28, as disclosed at step 221. Such enabling and disabling is performed at a level of granularity of the module 28, in which each of the modules 28 corresponds to a component and is operable be enabled and disabled by activation and deactivation of the corresponding component, as depicted at step 222. Therefore, activation and deactivation further includes identifying, in the module server 80 in the process 26, when to activate and deactivate respective modules 28, via the activation manager 36, based on information in the global timer map 50 in the module server 80.

Employing the IOR 54-2 retrieved from the global timer map 50, the timer service 32 notifies the subscriber 60 in the identified module 28 of expiration of the timer corresponding the entry 52, as shown at step 223. The timer service 32 indexes, via the local timer map 40, a dispatch command 44-2 operable to dispatch the timer handler 62 corresponding to the name 44-1 of the expired timer 52. Note that the timer name is one of the parameters provided to the dispatch 44-2 command by the timer service 32. The subscriber 60 then invokes the timer handler 62 of the subscriber 60, and passes the timer parameters via the dispatch command 44-2, to execute the timer handler 62, as depicted at step 225.

The exemplary configuration shown is a multithread system, in which the modules 28 employ one or more threads during execution. Accordingly, invocation of the timer handler 62 in the subscriber involves placing an entry in a thread queue for the module. Therefore, in the particular exemplary configuration shown, each of the modules 28 is operable to include a plurality of threads, and disabling is performed by a thread manager 78 operable to gracefully terminate each of the threads prior to deactivation, deactivation occurring by informing each of the threads of the termination and computing when each thread has attained a termination point, as depicted at step 226.

Further, in the case of periodic timers, the timer service 32 distinguishes successive iterations of the periodic timer, since the timer name is similar. Accordingly, at step 227, the timer service 32 associates the timer 52 with a generation counter 87. The generation counter 87 incrementally labels each timer invocation from a particular subscriber 60, and compares the generation counter 87 upon completion of a particular invocation of a timer handler 62, as depicted at step 228. The timer service 32 cancels a particular timer if the generation counter 87 indicates that the timer handler corresponds to the generation counter, or, to clarify, that the timer generation just handled is to be cancelled, as shown at step 229. Further, since periodic timers refer to the same name, the timer service maintains, if the timer is periodic, the pending timer corresponding to the subscriber if the generation counter 87 does not match, i.e. refers to the next period for which the timer will expire.

Figure 9:
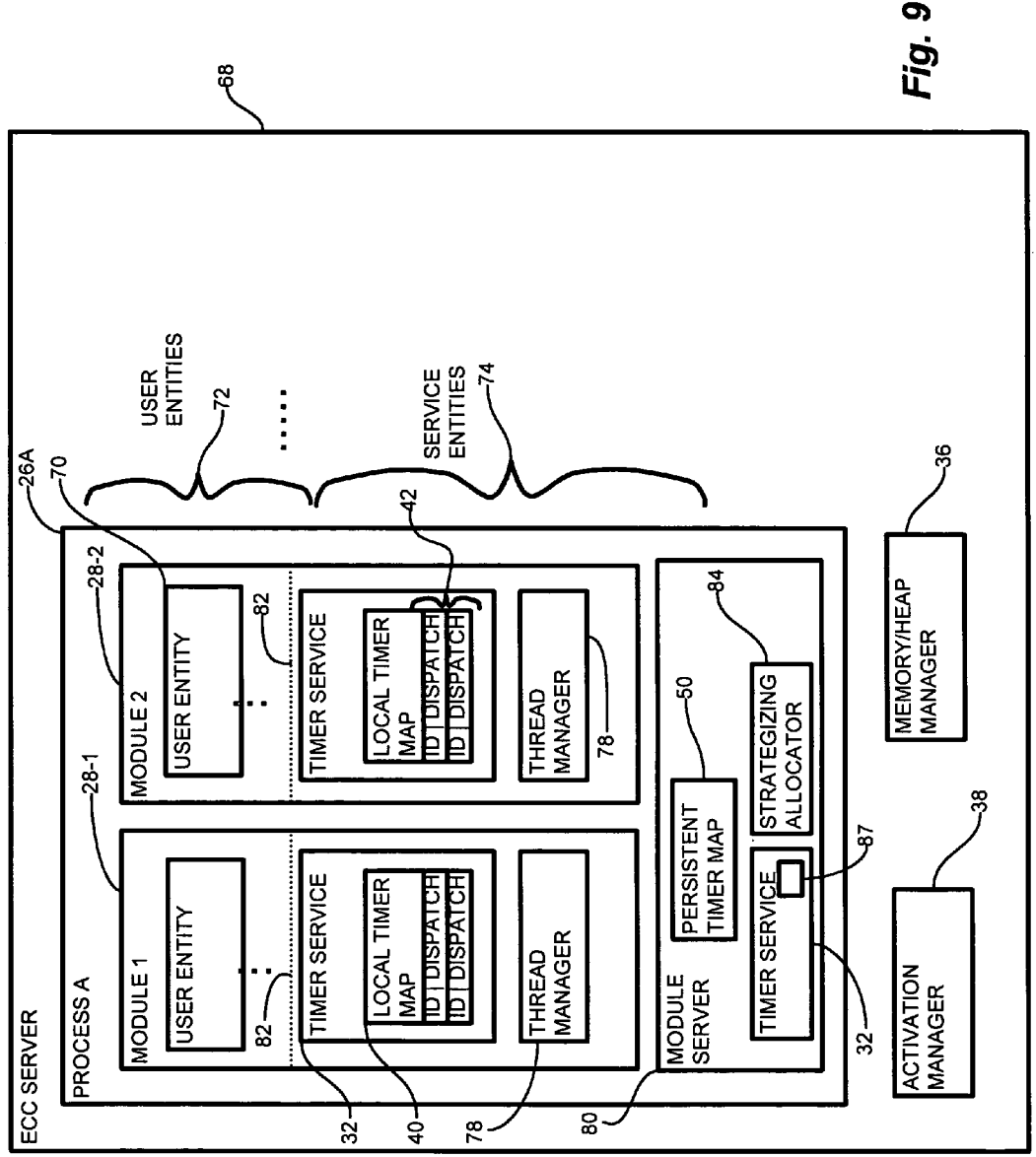
FIG. 9 shows the exemplary configuration infrastructure illustrating the separation of user entities.

FIG. 9 shows the exemplary configuration illustrating the separation of user entities and service entities in the SAN environment. As indicated above, the module server 80 employed for providing the timer service also provides a services framework, or architecture, operable to implement additional service, shown as service 32-N in FIG. 4. Such a services framework is employed as a development infrastructure, removing developers from the intricacies of the services which they employ in developing the application, here, the exemplary SAN management application. Accordingly, the development infrastructure allows developers to develop software entities without being burdened with excessive knowledge requirements of the underlying technology providing the services. The result is a seamless, embedded services layer 81 which allows developers of individual modules to "plug in" and employ the services therein requiring only a lightweight interface. Referring to FIGS. 3 and 9, an exemplary configuration of the server 12 in a storage area network 16 as in FIG. 1 is disclosed.

The server 12 in the exemplary configuration is an ECC server 68, operable according to the general notion of the server/machine 12 of FIG. 1. The ECC server 68 includes one or more processes 26-A, each including entities 25. The server 68 further distinguishes user entities 72, including subscriber 60 entities and timer handler 62 entities, shown generally as a user entity 70, and service entities 74, demarcated by dotted line 82, in each particular module 28. The server also includes entities which provide administrative and overhead operations, such as the strategizing allocator 84, the activation manager 38, the memory/heap manager 36, and the generation counter 87 in the timer service.

Figure 10:
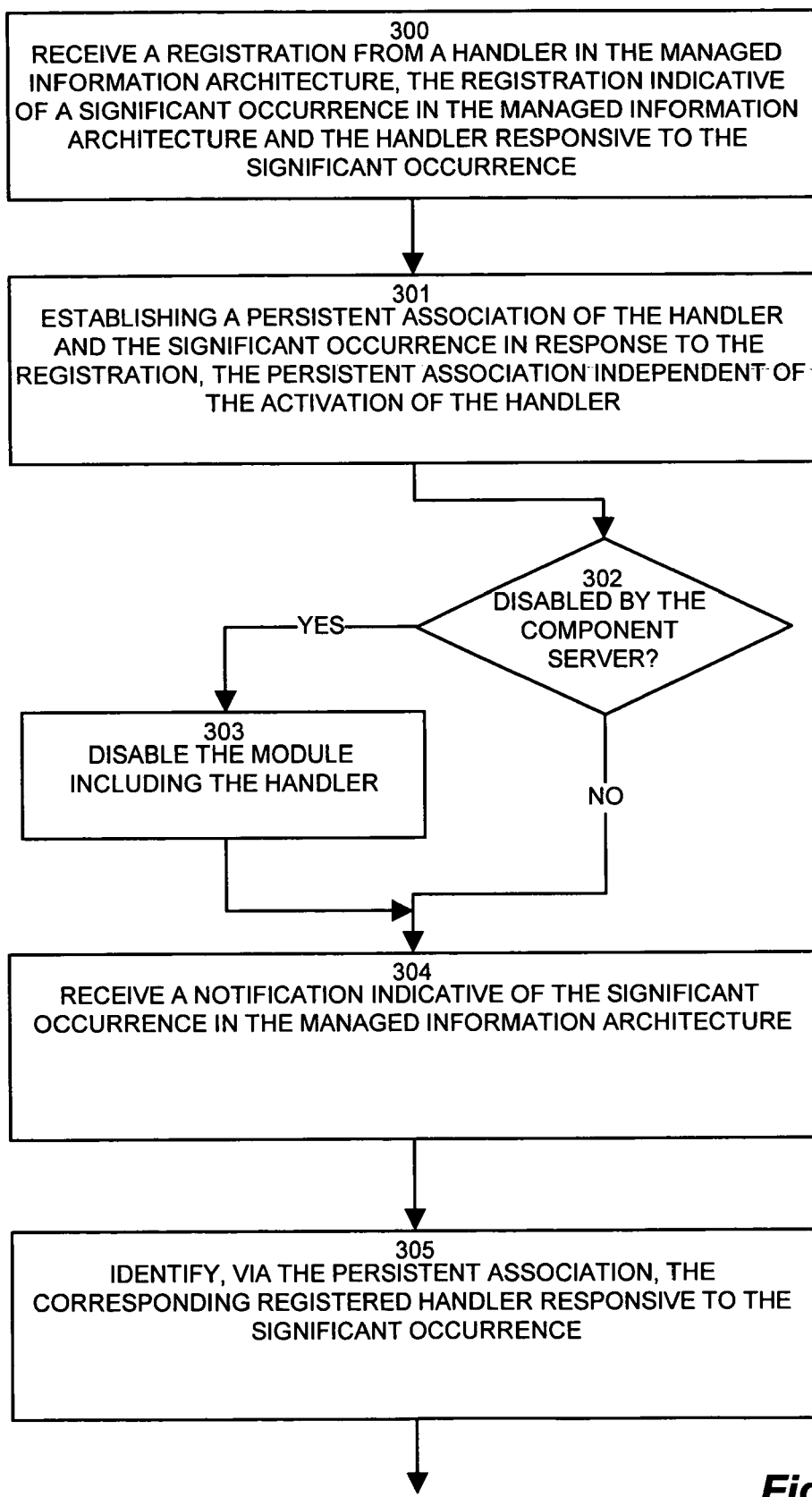
FIGS. 10 and 11 are a flowchart depicting operation of a system for interprocess communication employing the development infrastructure of FIG. 9.
Figure 11:
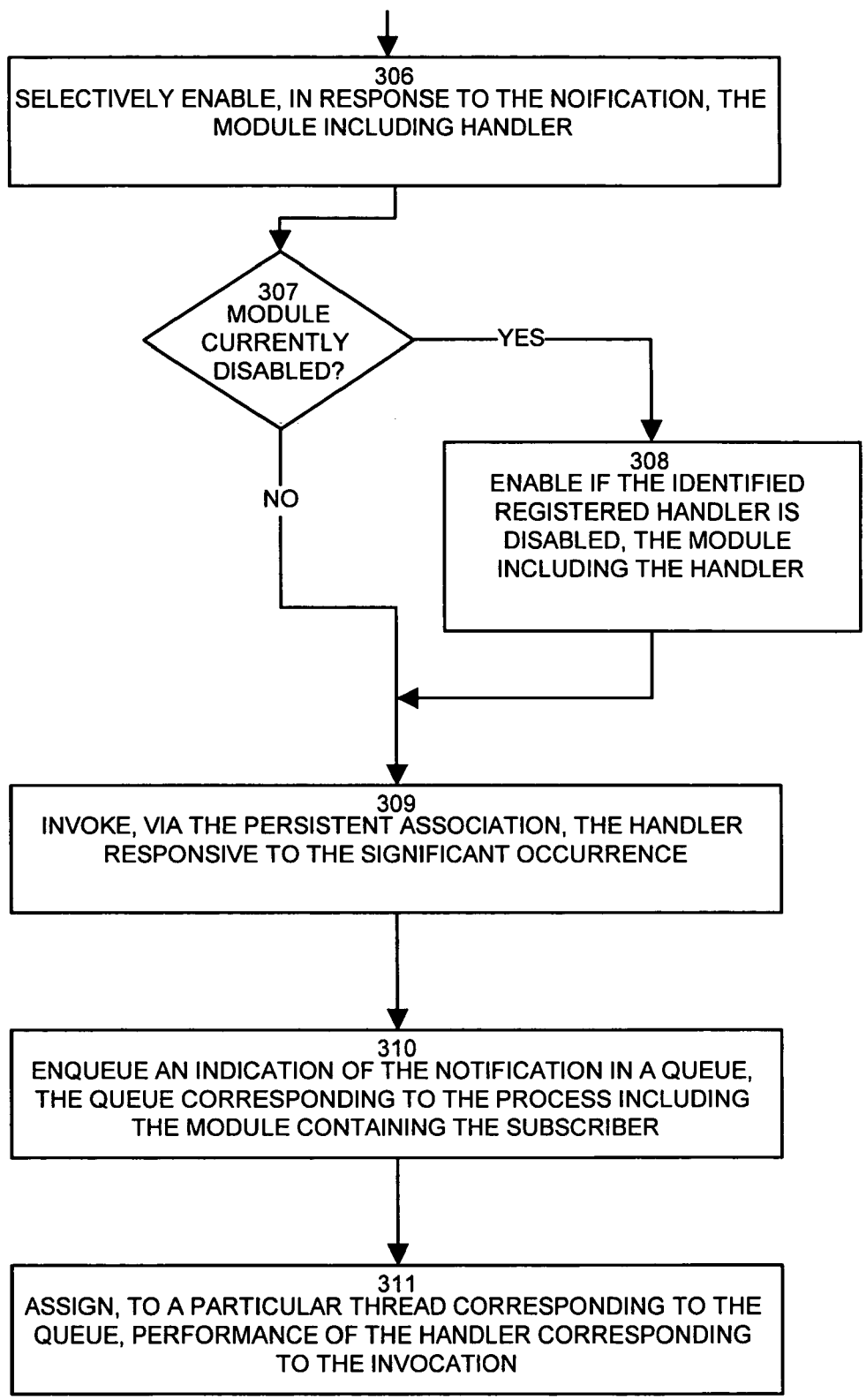

FIGS. 10 and 11 are a flowchart of a service for interprocess communication employing the development infrastructure of FIG. 9. Such a services oriented development infrastructure is applicable, in particular configuration, to the timer service infrastructure disclosed herein, to the event service infrastructure as disclosed in the copending patent application referenced above, and in alternate configurations operable in accordance with an event or message driven interprocess messaging, communication, and activation environment such as the SAN environment 10 or other services based environment. The mechanism for interprocess communication in the exemplary managed information architecture includes receiving a registration from a subscriber in the managed information architecture, in which the registration is indicative of a significant occurrence in the managed information architecture and the handler responsive to the significant occurrence, as depicted at step 300. Such significant occurrences may be a timer as above, an event, such as in the cited copending event service application, or other informational item for communication from one class (processing) entity 25 to another.

The service establishes a persistent association of the handler 62, via the corresponding module 60, and the significant occurrence in response to the registration, the persistent association independent of the activation of the handler 62, as shown at step 301. The service 32-N allows enablement and disablement (activation and passivation) of modules according to processing needs and demands, and accordingly, during processing, any of the modules may be selected for disabling by the module (component) server 80, as depicted at step 302. If a module is to be disabled, then at step 303 the component server disables the module including the handler.

At step 304, the significant occurrence transpires, and the service 32-N receives a notification indicative of the significant occurrence in the managed information architecture. The service 32-N identifies, via the persistent association in either the global map 50 or the local map 40, the corresponding registered handler 62 and module 28 responsive to the significant occurrence, as depicted at step 305. If the corresponding module 28 is currently disabled, the service 32-N will need to selectively enable the module 28 including the subscribed handler 62 in response to the notification, as depicted at step 306.

Accordingly, the service 32-N performs a check, as depicted at step 307, to determine if the subscriber 60 including the registered handler 62 is currently disabled, and enables, if the identified registered handler 62 is disabled, the module 28 including the subscriber and registered handler 62, as shown at step 308. Therefore, the persistent association provided by the local and global maps 40, 50 are independent of enabling and disabling of the handler, the service 32-N in the component server 80 determines if the module is disabled, and enables the module accordingly after identifying, via the persistent association, the corresponding registered handler responsive to the significant occurrence.

The service 32-N then invokes, via the persistent association, the handler responsive to the significant occurrence, as depicted at step 309. As the process 26 is a multi threaded process, the service 32-N assigns a thread in the module 28 for execution of the invoked subscriber 60 and handler 62, by enqueuing an indication of the timer expiration in a queue, in which the queue corresponds to the process 26 including the module 28 containing the subscriber 62. After enqueuing, the module server 80 assigns, to a particular thread corresponding to the queue, the performance (execution) of the timer handler 62 corresponding to the invocation, as depicted at step 311, and the service 32-N executes the handler 62 in the assigned thread. The queues and threads, in the particular exemplary implementation, employ features of C++ for process synchronization, blocking, and reentrancy, as are known to those of skill in the art. Alternate configurations may employ different forms of process and component management.

In particular configurations, implementation of the system of the present invention is performed on a C++ based platform including CORBA support. Such an exemplary configuration, as discussed above, demonstrates implementation practices discussed below. Such implementation practices are not intended to limit configurations of the invention except as claimed. In particular, such implementation practices illustrate a particular embodiment for performing at least certain features of the invention, including but not limited to automatically activating a module when a timer expires; subscribing components can be passivated at any time; the communication channels used by the timer service are transparent to component developers; and developers need not know OMG IDL, and may exploit the full power of C++ for subscriber class definitions. Such implementation practices include the following features.

The timer service leverages the Adaptive Communications Environment (ACE) Reactor that drives The ACE ORB (TAO, as is known in the art). For each scheduled timer, the service registers a reference-counted timer handler, derived from ACE_Event_Handler, with TAO's core ACE Reactor. The timer handler holds the IOR of the subscribing component, which the timer handler's handle_timeout( ) uses to deliver the timer event to the subscriber. Reference-counting the timer handler is imperative in order to keep a timer handler alive, because another thread may simultaneously cancel its associated timer. The timer handler class has a C++ virtual table, because it derives from the ACE_Event_Handler class. Since components can be passivated at any time, the timer handler class should not be allocated on the components' heap, but must instead be allocated on the component server's heap. The timer handler constructor's access is restricted, and the timer event factory enforces that the component server's heap is used. Notice that the timer handler cannot be a class template, since automatic template instantiation prevents proper allocation of the timer handler.

Publication of a timer event following expiration may cause the activation of the subscriber's component. In its initialize( ), that component may reschedule( ) that same timer. However, if the timer is aperiodic, the timer service will cancel that timer when the publication completes, thus overriding the rescheduling in initialize( ). To resolve this problem, a generation counter is associated with each timer. Upon rescheduling the timer in initialize( ), the timer's generation counter is incremented. When timer event publication completes and the timer is about to be cancelled, that generation counter is checked. If the generation counters do not match, the timer is not cancelled.

A timer command class template "records" the type of the subscriber via thread templatization. Additionally, the timer command hosts a subscriber reference and the timer's parameters. The timer command verifies at compile time the presence of the timeout handler within the subscriber's class, thereby making the event service strongly typed. To reduce C++ code bloat, and to allow polymorphic containment, the timer commands derive from a non-template class.

The timer service distributes the event subscription information into multiple locations. The global timer service resides in the component server's memory and maps components and timer keys to timer component (module) IORs. Each component hosts its own component timer service, which maps timer keys to timer commands. Splitting the subscription information in this manner allows on-demand passivation of components. The subscribing component will be activated, if necessary, by the event-dispatching CORBA call. In the context of this call, the invoked component determines the subscribers for that event by querying its component timer service. Finally, the module server publishes (i.e. invokes) the timer expiration to the subscriber instance, which proceeds to handle the timer event in the timeout handler member function. Notice that the only purpose of the event-dispatching CORBA call is to activate the components on demand so that subscribers can handle events at any time with no race conditions.

To allow on-demand component passivation, the component's threads should support cooperative thread cancellation. To this end, the component framework creates an instance of the ACE_Thread_Manager class in every component. This manager controls all non-TAO threads running within that component. The component framework provides two threading classes (Thread and Task) that seamlessly integrate the component's thread manager.

Unless explicitly instantiated, the compiler determines the compilation unit where the template code is emitted. It is crucial for the component server that each dynamic memory allocation be followed by a corresponding deletion from the same memory pool. To guarantee this correspondence, each class template features a polymorphic method void delete_this( ), which then simply invokes delete on itself by issuing: delete this. Controlled by an instance of a custom smart pointer, such a class template automatically invokes the delete_this( ) method upon destruction. This guarantees that deletion occurs in the same memory pool as allocation. Consequently, components compiled with different compilation flags can freely interoperate within a single component server.

Further, the combining of the timer service with the aforementioned event service in may be particularly beneficial when employed such that the timer service conveys timer expirations to a particular subscriber, which then broadcasts the occurrence of this timer event using the event service.

The timer service infrastructure disclosed herein may encompass a variety of alternate deployment environments. In a particular configuration, the exemplary SAN management application discussed may be the EMC Control Center (ECC) application, marketed commercially by EMC corporation of Hopkinton, Mass., assignee of the present application.

Those skilled in the art should readily appreciate that the programs and methods for defining, subscribing to and handling timer expirations as defined herein are deliverable to a processing device in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, for example using baseband signaling or broadband signaling techniques, as in an electronic network such as the Internet or telephone modem lines. The operations and methods may be implemented in a software executable object or as a set of instructions embedded in a carrier wave. Alternatively, the operations and methods disclosed herein may be embodied in whole or in part using hardware components, such as Application Specific Integrated Circuits (ASICs), state machines, controllers or other hardware components or devices, or a combination of hardware, software, and firmware components.

While the system and method for defining, subscribing to and handling timer expirations has been particularly shown and described with references to embodiments thereof, it will be understood by those skilled in the art that various changes in form and details may be made therein without departing from the scope of the invention encompassed by the appended claims. Accordingly, the present invention is not intended to be limited except by the following claims.

What is claimed is:

1. A method for processing timer events, the method comprising:

receiving a timer subscription containing a time value, a timer identity and an identity of a module to notify upon expiration of the time value, each module operable to include a plurality of threads;

establishing a timer in a component execution environment to track expiration of the time value;

detecting expiration of the timer;

in response to detecting expiration of the timer, determining if the module is disabled, and if the module is disabled, enabling the module, enabling modules corresponding to activation of a corresponding component by an activation mechanism, disabling corresponding to deactivation of the corresponding component by the activation mechanism, the activation and deactivation operations operable to reduce memory consumption by inactive components and provide selective invocation to maintain availability of the component;

notifying a subscriber in the module of expiration of the timer, enabling and disabling being performed at a level of granularity of the modules, each of the modules corresponding to a component and operable be enabled and disabled by activation and deactivation of the corresponding component, and receiving a second timer subscription to the same timer as the timer subscription, the timer identified by a timer name provided by both the timer subscription and the second timer subscription.

2. The method of claim 1 wherein the module includes a timer handler in the subscriber, the timer subscription further indicative of the timer handler, and notifying the subscriber of the expiration of the timer further comprises invoking the indicated timer handler for execution.

3. The method of claim 2 wherein establishing the timer further comprises:

adding the identity of the module to a global timer map, the global timer map operable to indicate a plurality of modules; and adding a reference to the subscriber including the timer handler, into a local timer map associated with the module.

4. The method of claim 3 wherein invoking further comprises:

indexing, via the local timer map, a dispatch command operable to dispatch the timer handler.

5. The method of claim 4 wherein the local timer map includes an entry indicative of the subscriber including the timer handler within a module and the global timer map includes an entry indicative of the module.

6. The method of claim 4 wherein the reference is a dynamic offset from a base to the location in a particular instantiation of the module, the base operable to change upon reenablement of the module.

7. The method of claim 2 wherein the expiration of the timer and resulting timer initiated invocation of the timer handler is independent of the enablement of the subscriber including the timer handler.

8. The method of claim 4 wherein determining if the module is disabled further comprises:

employing the global timer map to find the entry corresponding to the timer expiration to determine the identity of the module corresponding to the timer event; and determining, from the identity of the module, if the module is disabled.

9. The method of claim 1 wherein the timer subscription is operable to indicate periodic and aperiodic expiration times.

10. The method of claim 2 wherein the subscription is received from a subscriber within the module, the subscriber including the timer handler.

11. The method of claim 1 wherein receiving the subscription further comprises receiving a subscription from multiple subscribers in the module, each subscriber operative to include a timer handler, further comprising, in response to detecting expiration of the timer, enabling disabled modules upon expiration of a timer subscribed to by any of the multiple subscribers.

12. The method of claim 1 further comprising resetting the expiration time value with an expiration time value from a second subscription for the same timer.

13. The method of claim 3 wherein activation and deactivation further comprises identifying, in a module server in communication with each of the modules, when to activate and deactivate modules based on information in the global timer map in a component server.

14. The method of claim 1 wherein disabling is performed by a thread manager operable to gracefully terminate each of the threads prior to deactivation, deactivation occurring by informing each of the threads of the termination and computing when each thread has attained a termination point.

15. The method of claim 2 further comprising:
associating the timer with a generation counter, the generation counter incrementally labeling each invocation from a particular subscriber;
comparing, upon completion of a timer handler, the generation counter;
canceling, if the generation counter indicates that the timer handler corresponds to the generation counter, the timer; and
maintaining, if the timer is periodic, the pending timer corresponding to the subscriber.

16. The method of claim 1 wherein associating the timer identity with a timer handler occurs in a native language of the timer handler and corresponding subscriber, and avoids a corresponding definition in an external interface language, the external interface language for generating timer specific code.

17. The method of claim 16 wherein the external interface language is an Interface Definition Language.

18. A method for time based invocation of subscribers comprising:
receiving a subscription to a timer, the timer associative of a timer handler and an expiration time, the timer handler having instructions operative for executing and completing a particular task and the expiration time indicative of performance of the particular task, the subscription including a timer identity;
associating the timer with the timer handler, the association including a generic timer reference applicable to a plurality of timer handlers, the association operable to selectively enable a module including the timer handler upon expiration of the timer handler;
receiving an indication of expiration of the timer;
determining, via the association, the corresponding timer handler and the module including the timer handler, the module operable to include a plurality of threads;
selectively enabling the module including the timer handler, enabling modules corresponding to activation of a corresponding component by an activation mechanism in a component execution environment;
dispatching the timer handler to execute and complete the time based task, enabling being performed at a level of granularity of the modules, each of the modules corresponding to a component and operable be enabled and disabled by activation and deactivation of the corresponding component, and receiving a second subscription to the same timer as the subscription, the timer identified by a timer name provided by both the subscription and the second subscription.

19. The method of claim 18 wherein, following selectively enabling:
enqueuing an indication of the timer expiration in a queue, the queue corresponding to a process including the module containing the subscriber; and
assigning, to a particular thread corresponding to the queue, performance of the timer handler corresponding to the expired timer.

20. The method of claim 18 further comprising
associating timer event data with each timer, and delivering the timer event data to the handler upon invocation of the timer handler; and
communicating, via the association of the timer handler and the timer, the timer data, the communicating of the data independent of the location of the timer handler.

21. An infrastructure server including a computer readable storage medium comprising executable instructions encoded thereon operable to perform processing that:
instructs a module server to receive a timer subscription containing a time value, a timer identity and an identity of a module to notify upon expiration of the time value, the module operable to include a plurality of threads;
instructs a timer service in the module server to establish a timer in a component execution environment to track expiration of the time value, the timer service further operable to detect expiration of the timer, the timer service further operable to, in response to detecting expiration of the timer, determine if the module is disabled, and if the module is disabled, enable the module, wherein enabling the module corresponds to activation of a corresponding component by an activation mechanism, wherein disabling corresponds to deactivation of the corresponding component by the activation mechanism, the activation and deactivation operations operable to reduce memory consumption by inactive components and provide selective invocation to maintain availability of the component;
instructs notification of a subscriber in the module of expiration of the timer, enabling and disabling being performed at a level of granularity of the modules, each of the modules corresponding to a component and operable be enabled and disabled by activation and deactivation of the corresponding component, and
instructs the module server to receive a second timer subscription to the same timer as the timer subscription, the timer identified by a timer name provided by both the timer subscription and the second timer subscription.

22. The infrastructure server of claim 21 wherein the module includes a timer handler in the subscriber, the timer subscription further indicative of the timer handler, and the timer service further operable to notify the subscriber of the expiration of the timer.

23. The infrastructure server of claim 22 further comprising a local timer map, the timer service operable to invoke the subscriber by indexing, via the local timer map, a dispatch command operable to dispatch the timer handler.

24. The infrastructure server of claim 22 further comprising a global timer map, wherein the timer service is operable to establish the timer by:
adding the identity of the module to the global timer map, the global timer map operable to indicate a plurality of modules; and adding a reference to the subscriber including the timer handler into a local timer map associated with the module.

25. The infrastructure server of claim 24 wherein the local timer map includes an entry indicative of the subscriber including the timer handler within a module and the global timer map includes an entry indicative of the module.

26. The infrastructure server of claim 24 wherein the reference is a dynamic offset from a base to the location in a particular instantiation of the module, the base operable to change upon reenablement of the module.

27. The infrastructure server of claim 22 wherein the timer service is operable to invoke the subscriber and the corresponding timer handler is independently of the enablement of the subscriber including the timer handler.

28. The infrastructure server of claim 22 wherein the timer service is operable to receive a subscription from a subscriber within the module, the subscriber including the timer handler.

29. The infrastructure server of claim 24 wherein the module server is in communication with each of the modules, and further operable to determine when to activate and deactivate modules based on information in the global timer map in module server.

30. The infrastructure server of claim 21 wherein disabling is performed by a thread manager operable to gracefully terminate each of the threads prior to deactivation, deactivation occurring by informing each of the threads of the termination and computing when each thread has attained a termination point.

31. The infrastructure server of claim 21 further comprising, for each timer, a generation counter, the timer service operable to associate each timer with the generation counter, the generation counter incrementally labeling each invocation from a particular subscriber, the timer service further operable to compare, upon completion of a timer handler, the generation counter; cancel, if the generation counter indicates that the timer handler corresponds to the generation counter, the timer, and maintain, if the timer is periodic, the pending timer corresponding to the subscriber.

32. A computer program product having a computer readable storage medium operable to store computer program logic embodied in computer program code encoded thereon for processing timer events in a services infrastructure, comprising:

computer program code for receiving a timer subscription containing a time value, a timer identity, and an identity of a module to notify upon expiration of the time value, the module operable to include a plurality of threads;

computer program code for establishing a timer in a component execution environment to track expiration of the time value;

computer program code for detecting expiration of the timer;

computer program code for, in response to detecting expiration of the timer, determining if the module is disabled, and if the module is disabled, enabling the module, enabling modules corresponding to activation of a corresponding component by an activation mechanism, disabling corresponding to deactivation of the corresponding component by the activation mechanism, the activation and deactivation operations operable to reduce memory consumption by inactive components and provide selective invocation to maintain availability of the component;

computer program code for notifying a subscriber in the module of expiration of the timer, enabling and disabling being performed at a level of granularity of the modules, each of the modules corresponding to a component and operable be enabled and disabled by activation and deactivation of the corresponding component, and computer program code for receiving a second timer subscription to the same timer as the timer subscription, the timer identified by a timer name provided by both the timer subscription and the second timer subscription.

33. A computer readable storage medium having program code embodying a processor based set of instructions thereon for processing timer events in a services infrastructure, comprising:

program code for receiving a timer subscription containing a time value, a timer identity and an identity of a module to notify upon expiration of the time value, the module operable to include a plurality of threads;

program code for establishing a timer in a component execution environment to track expiration of the time value;

program code for detecting expiration of the timer, the timer under the API control of application processes;

program code for, in response to detecting expiration of the timer, determining if the module is disabled, and if the module is disabled, enabling the module, enabling modules corresponding to activation of a corresponding component by an activation mechanism, disabling corresponding to deactivation of the corresponding component by the activation mechanism, the activation and deactivation operations operable to reduce memory consumption by inactive components and provide selective invocation to maintain availability of the component;

program code for notifying a subscriber in the module of expiration of the timer, enabling and disabling being performed at a level of granularity of the modules, each of the modules corresponding to a component and operable be enabled and disabled by activation and deactivation of the corresponding component; and program code for receiving a second timer subscription to the same timer as the timer subscription, the timer identified by a timer name provided by both the timer subscription and the second timer subscription.

34. A method for processing timer events, the method comprising:

receiving a first timer subscription containing a first time value, a timer identity and an identity of a first multi-thread module to notify upon expiration of the first time value;

receiving a second timer subscription containing a second time value, the timer identity and an identity of a second multi-thread module to notify upon expiration of the second time value;

establishing a timer in a component execution environment to track expiration of the first time value and the second time value;

detecting expiration of the timer relative to the first time value and the second time value;

in response to detecting expiration of the timer, for at least one of the first multi-thread module and the second multi-thread module:

determining if the module is disabled, and if the module is disabled, enabling the module, enabling modules corresponding to activation of a corresponding component by an activation mechanism, disabling corresponding to deactivation of the corresponding component by the activation mechanism, the activation and deactivation operations operable to reduce memory consumption by inactive components and provide selective invocation to maintain availability of the component; and notifying a subscriber in the module of expiration of the timer, enabling and disabling being performed at a level of granularity of the modules, each of the modules corresponding to a component and operable be enabled and disabled by activation and deactivation of the corresponding component.

35. The method of claim 1, wherein the component execution environment is a Common Object Request Broker Architecture (CORBA) environment, enabling further comprising loading Dynamic Link Library (DLL) for runtime binding of the activated module.

36. The method of claim 35 further comprising:
searching for the module in the global timer table to locate the corresponding module;
loading, if the located module is not already loaded, the module containing a timer handler corresponding to the expired timer; and
locating the corresponding timer handler in the loaded module from the local timer table.

37. The method of claim 36 wherein loading further comprises transferring the module from an unexecutable memory location to an executable memory location, loading and deactivating such that deactivating frees execution memory for use by other modules.

* * * * *